US012771779B2

(12) United States Patent
Wang

(10) Patent No.: US 12,771,779 B2
(45) Date of Patent: Oct. 20, 2026

(54) INCOMING CALL NOTIFICATION SYSTEM AND ELECTRONIC DEVICE

(71) Applicant: HONOR DEVICE CO., LTD., Shenzhen (CN)

(72) Inventor: Lei Wang, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 488 days.

(21) Appl. No.: 18/269,816

(22) PCT Filed: Dec. 15, 2022

(86) PCT No.: PCT/CN2022/139301
§ 371 (c)(1),
(2) Date: Jun. 27, 2023

(87) PCT Pub. No.: WO2023/207138
PCT Pub. Date: Nov. 2, 2023

(65) Prior Publication Data

US 2024/0187515 A1 Jun. 6, 2024

(30) Foreign Application Priority Data

Apr. 29, 2022 (CN) ........................ 202210465777.X

(51) Int. Cl.
*H04M 1/72454* (2021.01)
*H04M 1/00* (2006.01)
*H04M 1/72412* (2021.01)

(52) U.S. Cl.
CPC ....... *H04M 1/72454* (2021.01); *H04M 1/006* (2013.01); *H04M 1/72412* (2021.01)

(58) Field of Classification Search
CPC ......... H04M 1/72454; H04M 1/72412; H04M 1/006
See application file for complete search history.

(56) References Cited

U.S. PATENT DOCUMENTS 9,253,813 B2 * 2/2016 Liao ...................... H04W 76/16
9,612,999 B2 * 4/2017 Prakah-Asante ... H04M 1/6091
(Continued)

FOREIGN PATENT DOCUMENTS

CN 103997779 A 8/2014
CN 106100663 A 11/2016
(Continued)

*Primary Examiner* — David Bilodeau
(74) *Attorney, Agent, or Firm* — WOMBLE BOND DICKINSON (US) LLP

(57) ABSTRACT

Embodiments of this application disclose an incoming call notification system and an electronic device, and relate to the communication field. The incoming call notification system includes a first device and a second device, and there are one or more first devices. The second device is configured to receive an incoming call request. When a third device that meets a first preset condition exists in the first device, the third device is configured to: respond to the incoming call request, and give an incoming call notification in an incoming call notification manner preset in the third device. When the third device exists in the first device and the second device, a fourth device that does not meet the first preset condition in the first device is configured to give an incoming call notification in a mute mode.

16 Claims, 16 Drawing Sheets

(56) References Cited

U.S. PATENT DOCUMENTS

| | | | | |
|---|---|---|---|---|
| 9,667,811 | B2 * | 5/2017 | Choi | H04M 19/04 |
| 10,404,847 | B1 * | 9/2019 | Unger | H04M 1/6041 |
| 12,323,670 | B2 * | 6/2025 | Suzuki | H04N 21/4223 |
| 2013/0288655 | A1 * | 10/2013 | Foruntanpour et al. | H04M 1/6008 455/418 |
| 2015/0341901 | A1 | 11/2015 | Ryu et al. | |
| 2015/0350418 | A1 * | 12/2015 | Rauenbuehler | H04M 1/724 455/414.1 |
| 2016/0366263 | A1 * | 12/2016 | Song | H04R 25/554 |
| 2017/0289329 | A1 * | 10/2017 | Yim | H04W 88/02 |
| 2018/0324756 | A1 | 11/2018 | Ryu et al. | |
| 2018/0338026 | A1 * | 11/2018 | Jon | G06F 3/04883 |
| 2019/0357021 | A1 * | 11/2019 | Kim | G08B 5/228 |
| 2022/0294891 | A1 * | 9/2022 | Liu | H04M 3/465 |

FOREIGN PATENT DOCUMENTS

| | | | |
|---|---|---|---|
| CN | 106550101 | A | 3/2017 |
| CN | 107257418 | A | 10/2017 |
| CN | 107395910 | A | 11/2017 |
| CN | 109639905 | A | 4/2019 |
| CN | 111835907 | A | 10/2020 |
| TW | 201123818 | A | 7/2011 |
| WO | 2021169538 | A1 | 9/2021 |

* cited by examiner

INCOMING CALL NOTIFICATION SYSTEM AND ELECTRONIC DEVICE

CROSS-REFERENCE TO RELATED APPLICATIONS

This application is a national stage of International Application No. PCT/CN2022/139301, filed on Dec. 15, 2022, which claims priority to Chinese Patent Application No. 202210465777.X, filed on Apr. 29, 2022. The disclosures of both of the aforementioned applications are hereby incorporated by reference in their entireties.

TECHNICAL FIELD

Embodiments of this application relate to the communication field, and in particular, to an incoming call notification system and an electronic device.

BACKGROUND

With progress of electronic technologies, a plurality of types of terminal devices, for example, a mobile phone, a tablet, a computer, and a watch, have been developed.

The plurality of types of terminal devices may establish a trusted device ring by logging in to a same account, so as to facilitate coordinated work. For example, when a terminal device in the trusted device ring receives an incoming call, another terminal device in the trusted device ring may simultaneously give an incoming call notification. For example, the trusted device ring includes a mobile phone, a tablet, and a watch. An incoming call notification manner set in the mobile phone is ringing, and incoming call notification manners set in the tablet and the watch are vibration. When the mobile phone receives an incoming call, the mobile phone rings, and the tablet and the watch vibrate.

It may be learned that in such an incoming call notification solution, when a terminal device in the trusted device ring receives an incoming call, another terminal device indiscriminately gives an incoming call notification. There is relatively low intelligence, and user experience is affected.

SUMMARY

Embodiments of this application provide an incoming call notification system and an electronic device, to achieve relatively high intelligence, implement application to relatively rich scenarios, and achieve relatively good user experience.

To achieve the foregoing objective, the following technical solutions are used in the embodiments of this application.

According to a first aspect, an incoming call notification system is provided. The system includes a first device and a second device, and there are one or more first devices. The second device is configured to receive an incoming call request. When a third device that meets a first preset condition exists in the first device, the third device is configured to: respond to the incoming call request, and give an incoming call notification in an incoming call notification manner preset in the third device. The first preset condition includes at least one of the following cases: a screen-on state, an input state, and an output state. When the third device exists in the first device and the second device, a fourth device that does not meet the first preset condition in the first device is configured to give an incoming call notification in a mute mode.

Based on this solution, when the third device meets the first preset condition, it indicates that the third device is currently in a state of being used. When the second device receives the incoming call request, the third device gives an incoming call notification in the incoming call notification manner preset in the third device, and another device other than the third device in the first device gives an incoming call notification in a mute mode. In this way, it can be ensured that a user can learn of an incoming call in a timely manner, and disturbance of the incoming call notification to the user is reduced, to improve intelligence of the incoming call notification and improve user experience.

In a possible design, when no third device that meets the first preset condition exists in the first device and the second device, and an incoming call notification manner preset in the second device is any one of ringing, vibration, and vibration on ring, the first device is further configured to give an incoming call notification in a mute mode. Based on this solution, when there is no device that meets the first preset condition in the incoming call notification system, it indicates that no device is currently in a state of being used. In this case, if the incoming call notification manner set in the second device that receives the incoming call request is any one of ringing, vibration, and vibration on ring, the user may learn of, in a timely manner, the incoming call notification performed by the second device. Therefore, the first device gives a notification in the mute mode. In this way, it can be ensured that the user can learn of the incoming call in a timely manner, and disturbance of the incoming call notification to the user is reduced, to improve intelligence of the incoming call notification and improve user experience.

In a possible design, when no third device that meets the first preset condition exists in the first device and the second device, and the incoming call notification manner preset in the second device is giving a notification in a mute mode, the first device is further configured to give an incoming call notification in an incoming call notification manner preset in the first device. Based on this solution, it can be ensured that the user can learn of the incoming call in a timely manner.

In a possible design, before giving an incoming call notification, the first device is further configured to: determine whether the first device meets a second preset condition, and skip giving an incoming call notification if the first device meets the second preset condition. The second preset condition includes at least one of the following cases: a Do Not Disturb state and a coordination state. The Do Not Disturb state is used to indicate that a corresponding device is in a Do Not Disturb mode, a device identifier of a device that initiates the incoming call request is not in a whitelist in the Do Not Disturb mode, and the incoming call request meets a Do Not Disturb rule in the Do Not Disturb mode. The coordination state includes at least one of the following: a call state and a multi-screen coordination state. Based on this solution, disturbance of the incoming call notification to the user can be reduced, to improve intelligence of the incoming call notification and improve user experience.

In a possible design, the first devices are connected by using a near field communication network, second devices are connected by using a near field communication network, and the first device and the second device are connected by using a near field communication network. Based on this solution, impact of a network delay on coordinated work of devices in a trusted device ring is reduced, and timeliness of the coordinated work is improved.

In a possible design, when either the first device or the second device receives a first operation, the first device and the second device are further configured to stop giving an incoming call notification. The first operation is an answer operation or a decline operation for the incoming call notification. Based on this solution, after the user processes the incoming call on the second device, another device in the incoming call notification system synchronously cancels incoming call notification. There is a relatively low delay in a synchronous cancellation process, and therefore a case in which after the user processes the incoming call on the second device, the another device still continues to give an incoming call notification due to a network delay or the like is avoided. This reduces disturbance of the incoming call notification to the user, and improves user experience.

In a possible design, the giving an incoming call notification further includes displaying an incoming call interface. The incoming call interface includes a first control and a second control, the answer operation is an operation on the first control, and the decline operation is an operation on the second control. Based on this solution, the user intuitively processes the incoming call notification. This helps improve user experience.

According to a second aspect, an incoming call notification method is provided, and is applied to the incoming call notification system according to the first aspect. The method includes: Each first device obtains static service information of each device in the incoming call notification system in response to receiving first signaling, where the first signaling is sent by a second device to each first device in response to receiving an incoming call request, the first signaling is used to indicate the first device to give an incoming call notification, the static service information includes use state information and a preset incoming call notification manner, and the use state information is used to indicate whether the corresponding device meets a first preset condition: when a third device that meets the first preset condition exists in the first device, the third device gives an incoming call notification in an incoming call notification manner preset in the third device; and when the third device exists in the first device and the second device, a fourth device that does not meet the first preset condition in the first device gives an incoming call notification in a mute mode.

Based on this solution, when the third device meets the first preset condition, it indicates that the third device is currently in a state of being used. When the second device receives the incoming call request, the third device gives an incoming call notification in the incoming call notification manner preset in the third device, and another device other than the third device in the first device gives an incoming call notification in a mute mode. In this way, it can be ensured that a user can learn of an incoming call in a timely manner, and disturbance of the incoming call notification to the user is reduced, to improve intelligence of the incoming call notification and improve user experience.

In a possible design, the method further includes: When no third device that meets the first preset condition exists in the first device and the second device, and an incoming call notification manner preset in the second device is any one of ringing, vibration, and vibration on ring, the first device gives an incoming call notification in a mute mode. Based on this solution, when there is no device that meets the first preset condition in the incoming call notification system, it indicates that no device is currently in a state of being used. In this case, if the incoming call notification manner set in the second device that receives the incoming call request is any one of ringing, vibration, and vibration on ring, the user may learn of, in a timely manner, the incoming call notification performed by the second device. Therefore, the first device gives a notification in the mute mode. In this way, it can be ensured that the user can learn of the incoming call in a timely manner, and disturbance of the incoming call notification to the user is reduced, to improve intelligence of the incoming call notification and improve user experience.

In a possible design, when no third device that meets the first preset condition exists in the first device and the second device, and the incoming call notification manner preset in the second device is giving a notification in a mute mode, the first device gives an incoming call notification in an incoming call notification manner preset in the first device. Based on this solution, it can be ensured that the user can learn of the incoming call in a timely manner.

In a possible design, before the first device gives an incoming call notification, the method further includes: The first device determines whether the first device meets a second preset condition, and skips giving an incoming call notification if the first device meets the second preset condition. The second preset condition includes at least one of the following cases: a Do Not Disturb state and a coordination state. The Do Not Disturb state is used to indicate that a corresponding device is in a Do Not Disturb mode, a device identifier of a device that initiates the incoming call request is not in a whitelist in the Do Not Disturb mode, and the incoming call request meets a Do Not Disturb rule in the Do Not Disturb mode. The coordination state includes at least one of the following: a call state and a multi-screen coordination state. Based on this solution, disturbance of the incoming call notification to the user can be reduced, to improve intelligence of the incoming call notification and improve user experience.

According to a third aspect, an electronic device is provided. The electronic device includes one or more processors and one or more memories. The one or more memories are coupled to the one or more processors, and the one or more memories store computer instructions. When the one or more processors execute the computer instructions, the electronic device is enabled to perform the incoming call notification method according to any one of the designs of the second aspect.

According to a fourth aspect, a chip system is provided. A chip includes a processing circuit and an interface. The processing circuit is configured to: invoke a computer program stored in a storage medium from the storage medium, and run the computer program, to perform the incoming call notification method according to any one of the designs of the second aspect.

According to a fifth aspect, a computer-readable storage medium is provided. The computer-readable storage medium includes computer instructions, and when the computer instructions are run, the incoming call notification method according to any one of the designs of the second aspect is performed.

According to a sixth aspect, a computer program product is provided. The computer program product includes instructions, and when the computer program product is run on a computer, the computer is enabled to perform the incoming call notification method according to any one of the designs of the second aspect.

It should be understood that all technical features of the technical solutions provided in the third aspect, the fourth aspect, the fifth aspect, and the sixth aspect can correspond to the incoming call notification method provided in the second aspect and the possible designs of the second aspect, and therefore similar beneficial effects can be achieved. Details are not described herein.

DESCRIPTION OF EMBODIMENTS

Figure 1:
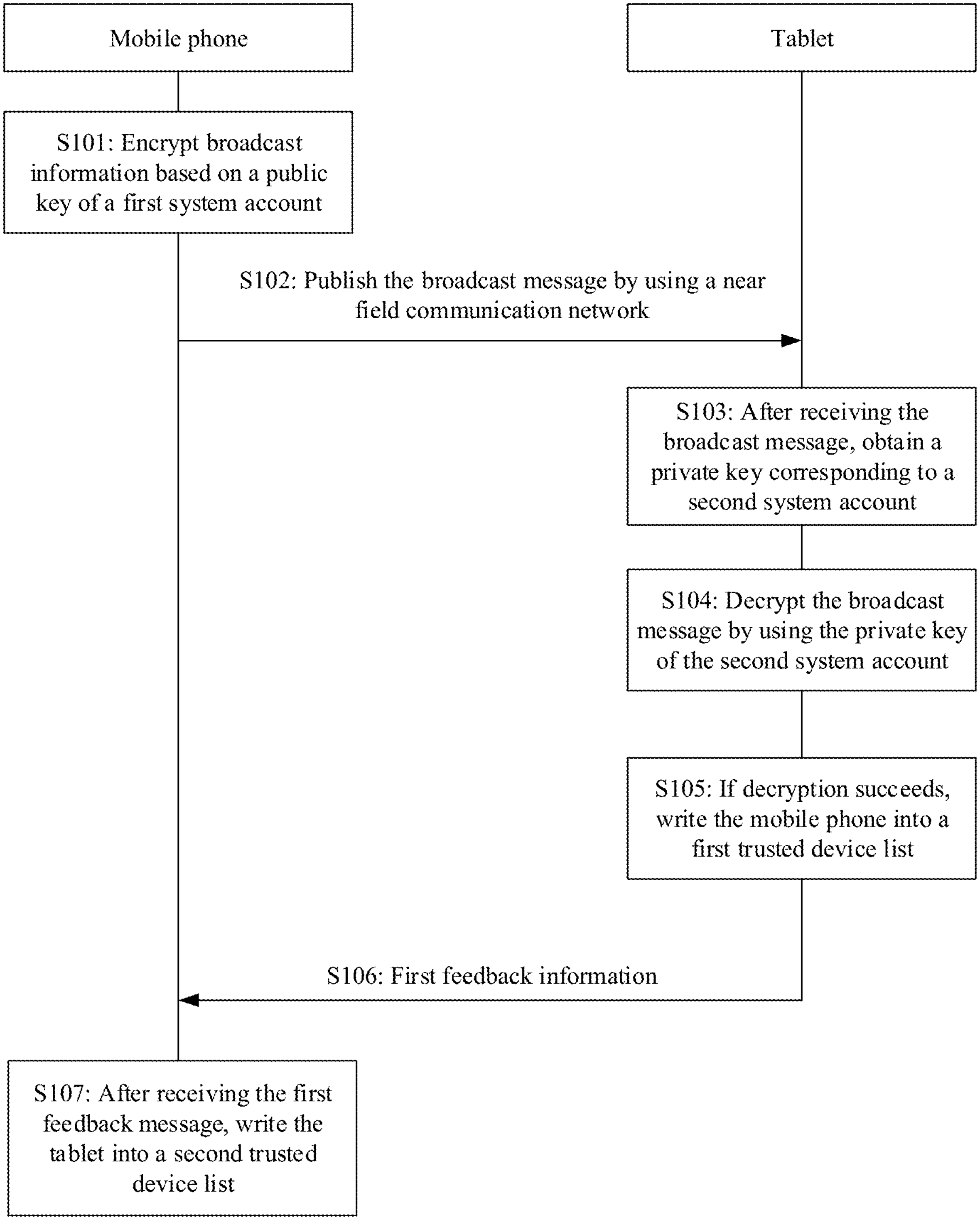
FIG. 1 is a schematic diagram of a method for establishing a trusted device ring by a mobile phone and a tablet according to an embodiment of this application.

The terms "first", "second", "third", and the like in the embodiments of this application are used to distinguish between different objects, and are not used to limit a specific sequence. In addition, the words such as "an example" or "for example" are used to represent giving an example, an illustration, or description. Any embodiment or design solution described as "an example" or "for example" in the embodiments of this application should not be construed as being more preferred or advantageous than other embodiments or design solutions. Exactly, use of the words such as "an example" or "for example" is intended to present a related concept in a specific manner.

To facilitate understanding of the embodiments of this application, background technologies in the embodiments of this application are first described below:

An embodiment of this application provides an incoming call notification method. The method is applied to a terminal device in a trusted device ring. The trusted device ring includes a plurality of terminal devices that may coordinate to implement a service such as a synchronous incoming call notification.

In the embodiments of this application, to establish a trusted device ring, all of a plurality of terminal devices need to meet the following conditions:

1. The terminal devices are connected by using a near field communication (near field communication, NFC) network.

In comparison with a case in which the terminal devices are connected by using a wide area network, when the terminal devices are connected by using the near field communication network, there is a lower network delay and higher coordination efficiency in coordinated work.

For example, the trusted device ring includes a terminal device 1, a terminal device 2, and a terminal device 3. After receiving an incoming call, the terminal device 1 indicates, by using the near field communication network, the terminal device 2 and the terminal device 3 to give an incoming call notification. After a user answers the incoming call or declines the incoming call on any terminal device, for example, the terminal device 2, the terminal device 2 indicates, by using the near field communication network, the terminal device 1 and the terminal device 3 to stop giving an incoming call notification. In this way, a synchronization delay between the terminal devices can be reduced, and user experience can be improved.

2. The terminal devices log in to a same system account.

In the embodiments of this application, the system account may be an account provided by an operating system of the terminal device. For example, operating systems of both a terminal device A and a terminal device B are an operating system S, and an account provided by the operating system S is a system account. The account provided by the operating system S may be an account registered by a user with a cloud server of the operating system S.

It should be noted that the operating system S of the terminal device A and the operating system S of the terminal device B may be of different versions. That is, a version number of the operating system S of the terminal device A and a version number of the operating system S of the operating system B may be different.

In addition, in the embodiments of this application, the operating system of the terminal device may be an operating system independently developed by a terminal device manufacturer, or may be an operating system developed by a terminal device manufacturer based on an existing operating system (for example, Android®) kernel.

It may be learned, based on the foregoing description, that for the terminal device 1 and the terminal device 2 that are connected by using the near field communication network, if the terminal device 1 can verify that a system account in to which the terminal device 1 logs is the same as a system account in to which the terminal device 2 logs, the terminal device 1 may establish a trusted device ring with the terminal device 2.

A method for establishing a trusted device ring by a mobile phone and a tablet is described below by using an example in which the terminal device 1 is a mobile phone and the terminal device 2 is a tablet. The mobile phone and the tablet are connected by using a near field communication network.

FIG. 1 is a schematic diagram of a method for establishing a trusted device ring by a mobile phone and a tablet according to an embodiment of this application. As shown in FIG. 1, the method includes S101 to S107.

S101: The mobile phone encrypts a broadcast message based on a public key of a first system account.

In this embodiment of this application, the first system account is a system account in to which the mobile phone logs. The broadcast message may be the first system account. That is, S101 may be as follows: The mobile phone encrypts the first system account by using the public key of the first system account. It may be understood that the broadcast message may alternatively be other data. This is merely an example for description, and does not mean that this application is limited thereto.

In this embodiment of this application, each system account may correspond to one public key used to encrypt information related to the system account. The public key corresponding to the system account may be stored in a cloud server with which the system account is registered. For example, the public key of the first system account may be stored in a cloud server with which the first system account is registered. Before performing S101, the mobile phone may first obtain the public key of the first system account from the cloud server with which the first system account is registered.

S102: The mobile phone publishes the broadcast message by using a near field communication network.

In some embodiments, the mobile phone may publish the broadcast message in real time by using the near field communication network.

In some other embodiments, when identifying a specific scenario, the mobile phone may publish the broadcast message by using the near field communication network. For example, the specific scenario may include: The mobile phone changes from a stationary state to a moving state, a location of the mobile phone changes, or a new terminal device is added to the near field communication network.

S103: After receiving the broadcast message, the tablet obtains a private key corresponding to a second system account.

The second system account is a system account in to which the tablet logs. In this embodiment of this application, each system account may correspond to one private key used to decrypt information related to the system account. That is, a public key and a private key of a same system account match each other, and data encrypted by using the public key may be decrypted by using the private key of the corresponding system account. The private key corresponding to the system account may be stored in a cloud server with which the system account is registered. For example, the private key of the second system account may be stored in a cloud server with which the second system account is registered.

In some embodiments, after receiving the broadcast message, the tablet may obtain the private key of the second system account from the cloud server with which the second system account is registered.

In some other embodiments, after logging in to the second system account, the tablet may obtain the private key corresponding to the second system account from the cloud server with which the second system account is registered, and store, at a trusted storage location, the private key corresponding to the second system account. In this way, after receiving the broadcast message, the tablet may obtain the private key of the second system account from the trusted storage location.

It should be noted that when logging out of the second system account, the tablet may delete the private key of the second system account stored at the trusted storage location.

S104: The tablet decrypts the broadcast message by using the private key of the second system account.

It may be understood that if decryption succeeds, it indicates that the private key of the second system account matches the public key of the first system account. That is, the second system account and the first system account are a same system account. If decryption fails, it indicates that the private key of the second system account does not match the public key of the first system account. That is, the second system account and the first system account are not a same system account.

S105: If decryption succeeds, the tablet writes the mobile phone into a first trusted device list.

S106: The tablet sends first feedback information to the mobile phone. The first feedback information is used to indicate that the tablet successfully decrypts the broadcast message.

If the tablet can successfully decrypt the broadcast message, it indicates that the tablet and the mobile phone log in to a same system account. The tablet and the mobile phone are connected by using the near field communication network, and therefore the tablet and the mobile phone have a prerequisite for establishing a trusted device ring. In this embodiment of this application, a terminal device in the first trusted device list is a terminal device in a same trusted device ring as the tablet, and that the tablet writes the mobile phone into a first trusted device list means that the tablet adds the mobile phone to the trusted device ring in which the tablet is located.

It should be noted that before sending the first feedback message to the mobile phone, the tablet may first encrypt the first feedback message by using a public key of the second system account, and when receiving the encrypted first feedback message, the mobile phone may decrypt the encrypted first feedback message by using a private key of the first system account, to improve security in a data exchange process.

In some embodiments, if decryption fails, the tablet may send a second feedback message to the mobile phone. The second feedback message is used to indicate that the tablet fails to decrypt the broadcast message.

In some other embodiments, if decryption fails, the tablet may not respond to the broadcast message, that is, not send any message to the mobile phone.

S107: After receiving the first feedback message, the mobile phone writes the tablet into a second trusted device list.

A terminal device in the second trusted device list is a terminal device in a same trusted device ring as the mobile phone. That the mobile phone writes the tablet into a second trusted device list means that the mobile phone adds the tablet to the trusted device ring in which the mobile phone is located.

By performing S101 to S107, the mobile phone and the tablet may be in a same trusted device ring.

It should be noted that in the same trusted device ring in which the mobile phone and the tablet are located, terminal devices may include all terminal devices in the first trusted device list and all terminal devices in the second trusted device list. That is, the terminal devices in the first trust device list are the same as the terminal devices in the second trusted device list.

When in the same trusted device ring, the mobile phone and the tablet can implement an incoming call notification synchronization service. For example, when the mobile phone receives an incoming call, the mobile phone and the tablet synchronously start an incoming call notification, for example, vibrate, ring, or display a notification interface. In this way, the user can independently select a terminal device to answer the incoming call.

It may be understood that when there are a relatively large quantity of terminal devices in the trusted device ring, disturbance is caused to the user if the terminal devices indiscriminately give an incoming call notification.

Figure 2:
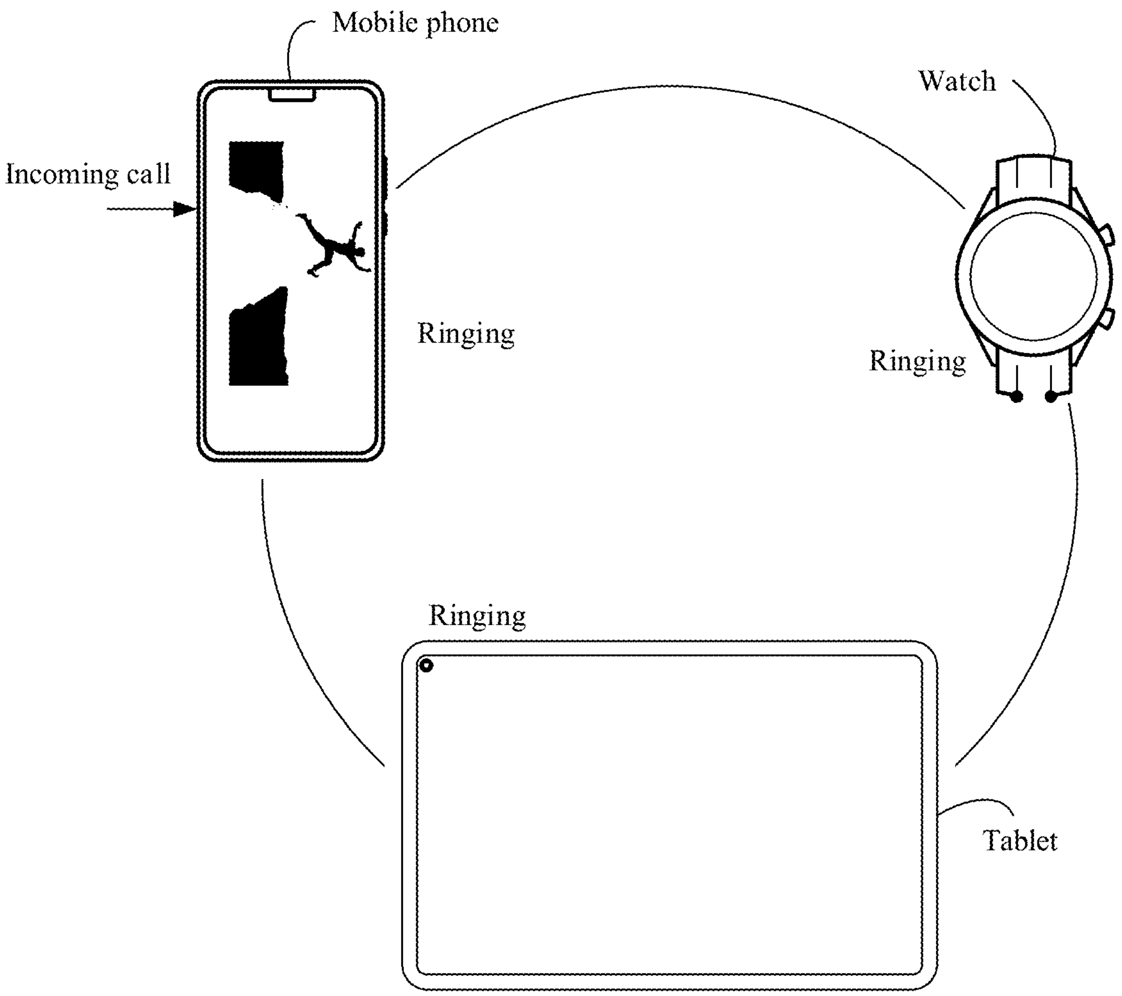
FIG. 2 is a schematic diagram of a trusted device ring.

For example. FIG. 2 is a schematic diagram of a trusted device ring. As shown in FIG. 2, the trusted device ring includes a mobile phone, a tablet, and a watch. In a conventional incoming call notification solution, when the mobile phone receives an incoming call, all of the mobile phone, the tablet, and the watch give an incoming call notification. For example, an incoming call notification manner of each of the mobile phone, the tablet, and the watch is ringing. When the mobile phone receives an incoming call while playing a movie, all of the mobile phone, the tablet, and the watch give an incoming call notification through ringing. However, in this scenario, a user is watching a movie on the mobile phone, and ringing of the mobile phone is enough to enable the user to learn of the incoming call. Therefore, ringing of the tablet and the watch is relatively redundant, which disturbs the user and affects user experience.

It may be learned that the conventional incoming call notification solution is applicable to a relatively single scenario, has relatively low intelligence, and affects user experience.

To resolve the foregoing problem, the embodiments of this application provide an incoming call notification method in which an incoming call notification can be intelligently given to meet user requirements in a plurality of scenarios and help improve user experience.

Figure 3:
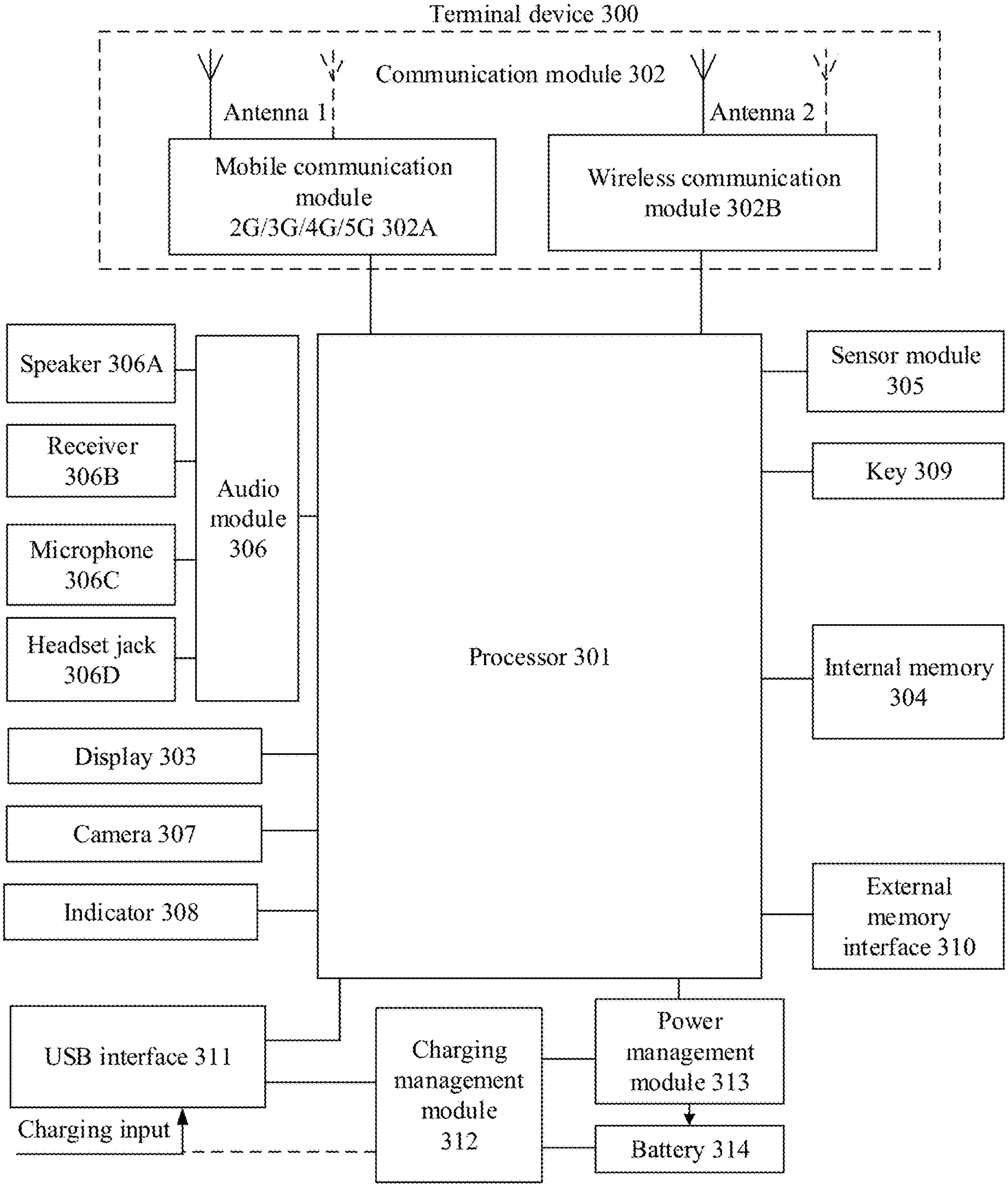
FIG. 3 is a schematic diagram of a structure of a terminal device according to an embodiment of this application.

In the embodiments of this application, the terminal device may be a portable terminal with a communication function, for example, a mobile phone, a tablet computer, a wearable device (for example, a smart watch), or a vehicle-mounted device. An example embodiment of the portable terminal includes but is not limited to a portable terminal equipped with iOS R®, Android®, Microsoft R®, or another operating system. The portable terminal may alternatively be, for example, a laptop computer (Laptop) having a touch-sensitive surface (for example, a touch panel). It should be further understood that in some other embodiments, the terminal may alternatively be a desktop computer having a touch-sensitive surface (for example, a touch panel). In an example. FIG. 3 is a schematic diagram of a structure of a terminal device 300 according to an embodiment of this application. The incoming call notification method provided in the embodiments of this application may be applied to the terminal device 300 shown in FIG. 3.

As shown in FIG. 3, the terminal device 300 may include a processor 301, a display 303, a communication module 302, and the like.

The processor 301 may include one or more processing units. The processor 301 may include an application processor (application processor. AP), a modem processor, a graphics processing unit (graphics processing unit. GPU), an image signal processor (image signal processor. ISP), a controller, a memory; a video stream codec, a digital signal processor (digital signal processor, DSP), a baseband processor, a neural-network processing unit (neural-network processing unit, NPU), and/or the like. Different processing units may be independent devices, or may be integrated into one or more processors 301.

The controller may be a nerve center and a command center of the terminal device 300. The controller may generate an operation control signal based on instruction operation code and a timing signal, to complete control of instruction fetching and instruction execution.

A memory may be further disposed in the processor 301, and is configured to store instructions and data. In some embodiments, the memory in the processor 301 is a cache. The memory may store instructions or data just used or cyclically used by the processor 301. If the processor 301 needs to use the instructions or the data again, the processor 301 may directly invoke the instructions or the data from the memory. This avoids repeated access and reduces waiting time of the processor 301, thereby improving system efficiency.

In some embodiments, the processor 301 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor 301 interface (mobile industry processor interface, MIPI), a general-purpose input/output (general-purpose input/output, GPIO) interface, a subscriber identity module (subscriber identity module, SIM) interface, a universal serial bus (universal serial bus, USB) interface 311, and/or the like.

The terminal device 300 implements a display function by using the GPU, the display 303, the application processor 301, and the like. The GPU is a microprocessor for image processing, and is connected to the display 303 and the application processor 301. The GPU is configured to perform mathematical and geometric calculation to perform graphics rendering. The processor 301 may include one or more GPUs, and the GPU executes program instructions to generate or change display information.

The display 303 is configured to display an image, a video stream, and the like.

The communication module 302 may include an antenna 1, an antenna 2, a mobile communication module 302A, and/or a wireless communication module 302B. For example, the communication module 302 includes the antenna 1, the antenna 2, the mobile communication module 302 A, and the wireless communication module 302B.

A wireless communication function of the terminal device 300 may be implemented by using the antenna 1, the antenna 2, the mobile communication module 302A, the wireless communication module 302B, the modem processor, the baseband processor, and the like.

The antenna 1 and the antenna 2 are configured to transmit and receive an electromagnetic wave signal. Each antenna in the terminal device 300 may be configured to cover one or more communication bands. Different antennas may be further multiplexed to improve antenna utilization. For example, the antenna 1 may be multiplexed as a diversity antenna of a wireless local area network. In some other embodiments, the antenna may be used in combination with a tuning switch.

The mobile communication module 302A may provide a wireless communication solution that is applied to the terminal device 300 and that includes 2G/3G/4G/5G and the like. The mobile communication module 302A may include at least one filter, a switch, a power amplifier, a low noise amplifier (low noise amplifier, LNA), and the like. The mobile communication module 302A may receive an electromagnetic wave through the antenna 1, perform processing such as filtering and amplification on the received electromagnetic wave, and transmit a processed electromagnetic wave to the modem processor for demodulation. The mobile communication module 302A may further amplify a signal modulated by the modem processor, and convert the signal into an electromagnetic wave through the antenna 1 for radiation. In some embodiments, at least some functional modules in the mobile communication module 302A may be disposed in the processor 301. In some embodiments, at least some functional modules in the mobile communication module 302A may be disposed in a same device as at least some modules in the processor 301.

The modem processor may include a modulator and a demodulator. The modulator is configured to modulate a to-be-sent low frequency baseband signal into a medium or high frequency signal. The demodulator is configured to demodulate a received electromagnetic wave signal into a low frequency baseband signal. Then, the demodulator transmits the low frequency baseband signal obtained through demodulation to the baseband processor for processing. The low frequency baseband signal is processed by the baseband processor and then transmitted to the application processor. The application processor outputs a sound signal through an audio device (which is not limited to a speaker 306A, a receiver 306B, and the like), or displays an image or a video stream on the display 303. In some embodiments, the modem processor may be an independent device. In some other embodiments, the modem processor may be independent of the processor 301, and is disposed in a same device as the mobile communication module 302A or another functional module.

The wireless communication module 302B may provide a wireless communication solution that is applied to the terminal device 300 and that includes a wireless local area network (wireless local area networks, WLAN) (for example, a wireless fidelity (wireless fidelity, Wi-Fi) network), Bluetooth (bluetooth, BT), a global navigation satellite system (global navigation satellite system, GNSS), frequency modulation (frequency modulation, FM), near field communication (near field communication, NFC), infrared (infrared, IR), and the like. The wireless communication module 302B may be one or more devices into which at least one communication processing module is integrated. The wireless communication module 302B receives an electromagnetic wave through the antenna 2, modulates and filters an electromagnetic wave signal, and sends a processed signal to the processor 301. The wireless communication module 302B may further receive a to-be-sent signal from the processor 301, perform frequency modulation and amplification on the to-be-sent signal, and convert the to-be-sent signal into an electromagnetic wave through the antenna 2 for radiation.

In some embodiments, in the terminal device 300, the antenna 1 is coupled to the mobile communication module 302A, and the antenna 2 is coupled to the wireless communication module 302B, so that the terminal device 300 can communicate with a network and another device by using a wireless communication technology. The wireless communication technology may include a global system for mobile communications (global system for mobile communications. GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system. GPS), a global navigation satellite system (global navigation satellite system. GLONASS), a BeiDou navigation satellite system (beidou navigation satellite system, BDS), a quasi-zenith satellite system (quasi-zenith satellite system, QZSS), and/or a satellite based augmentation system (satellite based augmentation systems, SBAS).

As shown in FIG. 3, in some implementations, the terminal device 300 may further include an external memory interface 310, an internal memory 304, a universal serial bus (universal serial bus, USB) interface, a charging management module 312, a power management module 313, a battery 314, an audio module 306, the speaker 306A, the receiver 306B, a microphone 306C, a headset jack 306D, a sensor module 305, a key 309, a motor, an indicator 308, a camera 307, a subscriber identification module (subscriber identification module, SIM) card interface, and the like.

The charging management module 312 is configured to receive a charging input from a charger. The charger may be a wireless charger or may be a wired charger. In some embodiments of wired charging, the charging management module 312 may receive a charging input from a wired charger through the USB interface 311. In some embodiments of wireless charging, the charging management module 312 may receive a wireless charging input through a wireless charging coil of the terminal device 300. While charging the battery 314, the charging management module 312 may further supply power to the terminal device 300 through the power management module 313.

The power management module 313 is configured to be connected to the battery 314, the charging management module 312, and the processor 301. The power management module 313 receives an input from the battery 314 and/or the charging management module 312, and supplies power to the processor 301, the internal memory 304, an external memory, the display 303, the camera 307, the wireless communication module 302B, and the like. The power management module 313 may be further configured to monitor parameters such as a capacity of the battery 314, a cycle count of the battery 314, and a state of health (leakage or impedance) of the battery 314. In some other embodiments, the power management module 313 may alternatively be disposed in the processor 301. In some other embodiments, the power management module 313 and the charging management module 312 may alternatively be disposed in a same device.

The external memory interface 310) may be configured to be connected to an external memory card, for example, a Micro SD card, to expand a storage capacity of the terminal device 300. The external memory card communicates with the processor 301 through the external memory interface 310, to implement a data storage function, for example, to store files such as music and a video stream in the external memory card.

The internal memory 304 may be configured to store computer-executable program code, and the executable program code includes instructions. The processor 301 runs the instructions stored in the internal memory 304, to perform various functional applications and data processing of the terminal device 300.

The internal memory 304 may further store one or more computer programs corresponding to the incoming call notification method provided in the embodiments of this application.

The terminal device 300 may implement an audio function, for example, music playing and recording, by using the audio module 306, the speaker 306A, the receiver 306B, the microphone 306C, the headset jack 306D, the application processor 301, and the like.

The key 309 includes a power key, a volume key, and the like. The key 309 may be a mechanical key 309, or may be a touch-sensitive key 309. The terminal device 300 may receive an input from the key 309, and generate a key signal input related to user setting and function control of the terminal device 300.

The indicator 308 may be an indicator light, and may be configured to indicate a charging status and a power change, or may be configured to indicate a message, a missed call, a notification, or the like.

The SIM card interface is configured to be connected to a SIM card. The SIM card may be inserted into the SIM card interface or removed from the SIM card interface to come into contact with or be separated from the terminal device 300. The terminal device 300 may support one or N SIM card interfaces, where N is a positive integer greater than 1. The SIM card interface may support a Nano SIM card, a Micro SIM card, a SIM card, or the like. A plurality of cards may be simultaneously inserted into a same SIM card interface. The plurality of cards may be of a same type or may be of different types. The SIM card interface may be further compatible with different types of SIM cards. The SIM card interface may also be compatible with an external memory card. The terminal device 300 interacts with a network by using the SIM card, to implement a call function, a data communication function, and the like. In some embodiments, the terminal device 300 uses an eSIM, namely, an embedded SIM card. The eSIM card may be embedded in the terminal device 300, and cannot be separated from the terminal device 300.

The sensor module 305 in the terminal device 300 may include components, for example, a touch sensor, a pressure sensor, a gyroscope sensor, a barometric pressure sensor, a magnetic sensor, an acceleration sensor, a distance sensor, an optical proximity sensor, an ambient light sensor, a fingerprint sensor, a temperature sensor, and a bone conduction sensor, to implement a function of sensing and/or obtaining different signals.

It may be understood that the structure shown in this embodiment does not constitute a specific limitation on the terminal device 300. In some other embodiments, the terminal device 300 may include more or fewer components than those shown in the figure, or some components may be combined, or some components may be split, or components may be arranged in different manners. The components shown in the figure may be implemented by using hardware, software, or a combination of software and hardware.

The hardware structure of the terminal device provided in this embodiment of this application is described above by using FIG. 3. An Android® system with a layered architecture is used as an example below to describe a software architecture of the terminal device provided in this embodiment of this application.

Figure 4:
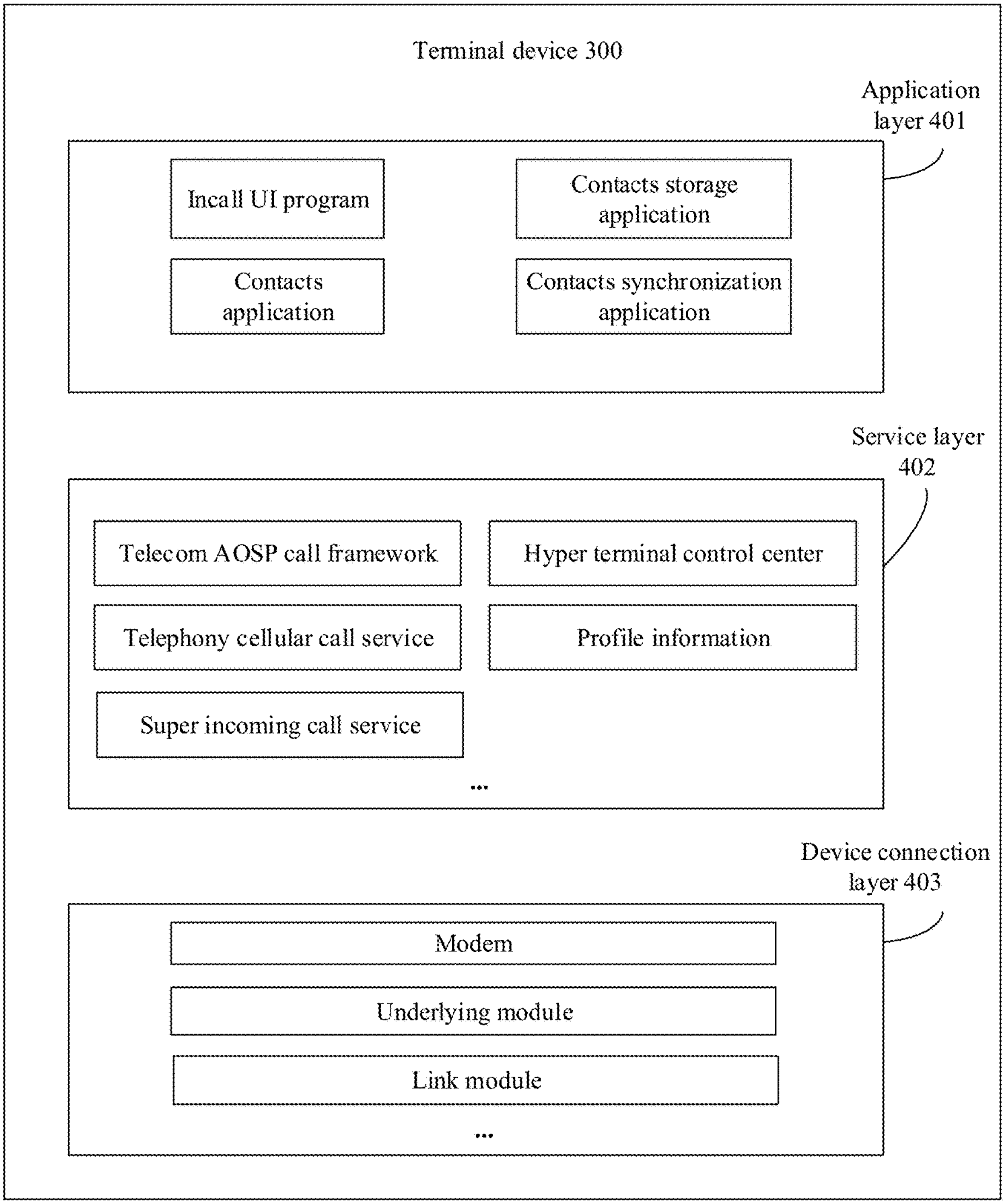
FIG. 4 is a schematic diagram of a software structure of a terminal device according to an embodiment of this application.

FIG. 4 is a schematic diagram of a software structure of a terminal device according to an embodiment of this application. As shown in FIG. 4, the software architecture of the terminal device 300 may be divided into three layers: an application layer 401, a service layer 402, and a device connection layer 403 from top to bottom.

As shown in FIG. 4, the application layer 401 may include applications such as an incoming call interface (Incall UI) program, a contacts application, a contacts storage application, and a contacts synchronization application. For example, when receiving an incoming call, the terminal device may start the Incall UI program to display an Incall UI, to prompt a user to answer the incoming call.

The service layer 402 may provide an application programming interface (application programming interface. API) and a programming framework for an application at the application layer 401. The service layer includes some predefined functions.

The programming framework may include a Telecom AOSP (Android Open-Source Project. Android Open-Source Project) call framework. The Telecom AOSP call framework may be used to manage audio and video calls of the terminal device, including a SIM (Subscriber Identity Module, subscriber identity module)-based call (for example, a call that uses a Telephony framework) and a VOIP call provided by a ConnectionService API implementer.

In addition, the API may further include an API configured to invoke a Telephony cellular call service, an API configured to invoke a Profile information service, an API invoking a super incoming call service, and an API invoking a hyper terminal control center. In this way, an installed application may invoke a corresponding API or programming framework from the service layer based on an actual service requirement, to implement a service required by a service.

In addition, the device connection layer 403 includes a device virtualization layer, a hardware abstraction layer (hardware abstraction layer. HAL), and a hardware layer.

For example, the hardware layer includes a plurality of types of hardware modules, and different hardware modules may implement different functions. For example, the hardware layer includes a modem and a Link module. The modem is configured to implement signal translation between different devices. The Link module is configured to implement a communication connection function between devices, and the like.

For another example, the HAL provides HALs, for example, an Audio HAL, a Camera HAL, and a Wi-Fi HAL, corresponding to different hardware modules. In this way, each HAL can drive a corresponding hardware module to implement a function corresponding to the hardware module.

In addition, at the device virtualization layer, a module for implementing a specific function may be virtualized based on the hardware module. For example, the device virtualization layer may include an audio virtualization module.

In this embodiment of this application, the HAL and the corresponding hardware module may be referred to as an underlying module. Similarly, the module virtualized at the device virtualization layer may also be referred to as an underlying module. It may be learned that the device connection layer includes underlying modules for implementing a plurality of functions. In this way, the device connection layer has a plurality of capabilities such as a Device Profile, a device networking discovery capability, partial authority management, security, and transmission.

It may be understood that the service layer may invoke one or more underlying modules at the device connection layer to indicate the device connection layer to enable different functions, for example, implement a call function. For ease of description, an underlying module configured to implement the call function may be referred to as an underlying call module.

For example, a service layer of a tablet may read or update a trusted device list of the tablet by invoking a Device Profile. The trusted device list of the tablet includes an identifier and static service information of another terminal device that is in a same trusted device ring as the tablet.

The static service information may include Profile information, device use state information, an incoming call notification manner, and the like.

The Profile information may include a Profile type supported by the corresponding terminal device. For example, a phonebook access profile (phonebook access profile, PBAP) type, a hands-free profile (hands-free profile, HFP) type, and an object push profile (Object Push Profile, OPP) type are supported. The Profile information may further include profile version information supported by the corresponding terminal device and the like.

The device use state information may indicate whether the corresponding terminal device is currently in a working state. In an example, the working state of the terminal may include at least one of the following: a screen-on state, an input state, an output state, and the like. The input state is used to indicate that the terminal device is in a state of receiving an information input, and an information input manner may include keyboard input, mouse input, touch input, audio/video data input, or the like. The output state is used to indicate that the terminal device is in an information output state, and an information output manner may include audio/video output, display output, or the like.

The incoming call notification manner may include giving a notification in a mute mode, ringing, vibration, vibration and ringing (vibration on ring), or the like. The giving a notification in the mute mode may be displaying an incoming call notification interface in the mute mode.

Terminal devices in a same trusted device ring may implement a near field communication connection by using respective Link modules. The terminal devices may exchange data based on the near field communication connection. For example, when a mobile phone and the tablet are in a same trusted device ring, the mobile phone may obtain static service information of the tablet, and the tablet may obtain static service information of the mobile phone.

The terminal device in the trusted device ring may synchronize static service information of another terminal device in real time or periodically. In this way, when Profile information, device use state information, or an incoming call notification manner of the terminal device in the trusted device ring is changed, another terminal device may learn of the profile information, the device use state information, or the incoming call notification manner in a timely manner. This helps improve efficiency of coordinated work between the terminal devices.

A process of synchronizing static service information between the terminal devices is described below by using an example in which the trusted device ring includes the mobile phone and the tablet, and the mobile phone synchronizes the static service information of the mobile phone to the tablet.

Figure 5:
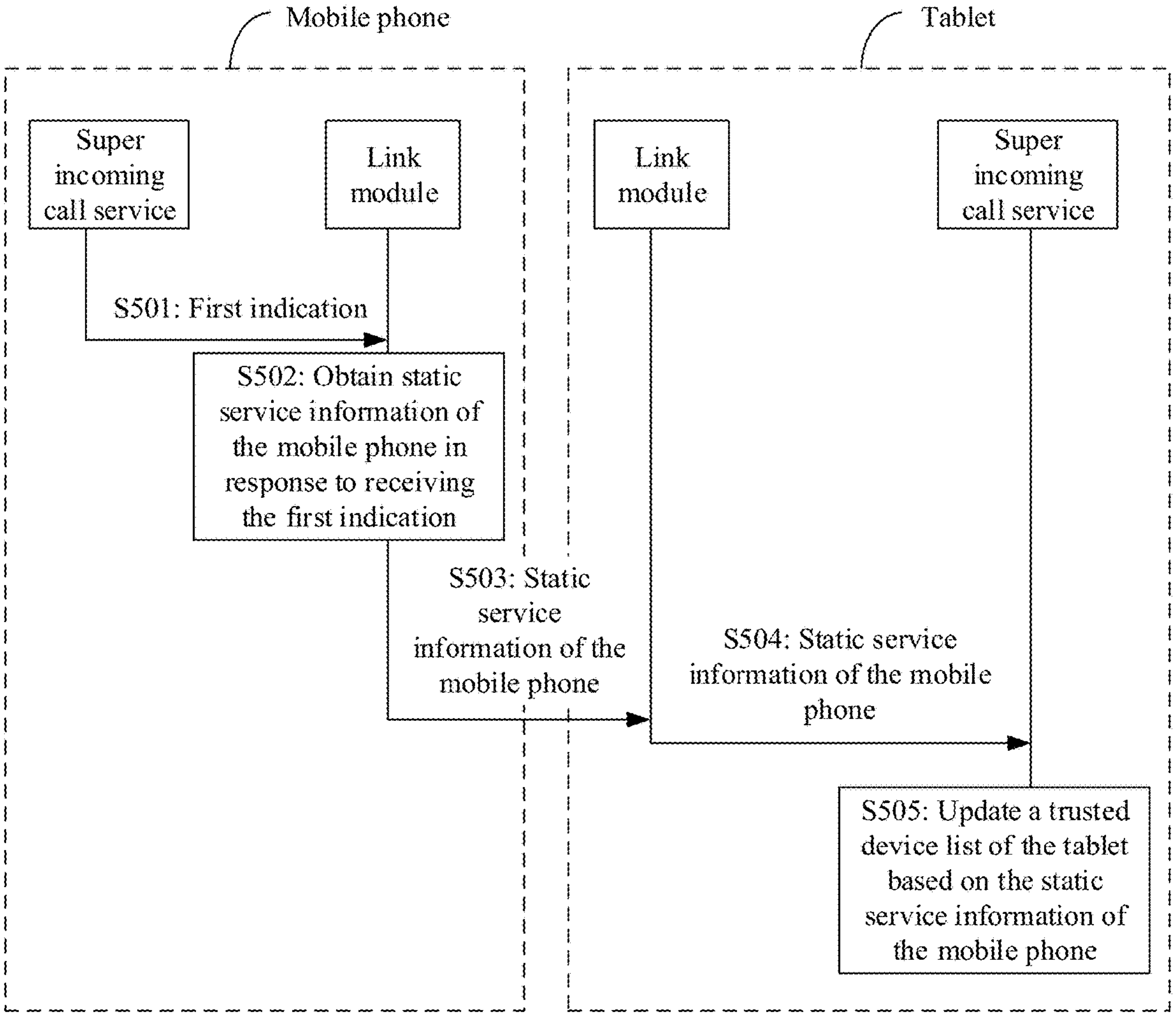
FIG. 5 is a schematic diagram of a method for synchronizing static service information according to an embodiment of this application.

FIG. 5 is a schematic diagram of a method for synchronizing static service information according to an embodiment of this application. As shown in FIG. 5, the solution includes S501 to S505.

S501: A super incoming call service of a mobile phone sends a first indication to a Link module of the mobile phone, where the first indication is used to indicate the Link module of the mobile phone to send static service information of the mobile phone to a Link module of a tablet.

In the related description in FIG. 4, in a terminal device, a Link module is configured to implement a communication connection function with another terminal device. The mobile phone and the tablet are connected by using a near field communication network, that is, the Link module of the mobile phone and the Link module of the tablet are connected by using a near field communication network. The mobile phone and the tablet may exchange data by using the respective Link modules.

S502: The Link module of the mobile phone obtains the static service information of the mobile phone in response to receiving the first indication.

For example, the Link module of the mobile phone may obtain the static service information of the mobile phone from a memory of the mobile phone.

S503: The Link module of the mobile phone sends the static service information of the mobile phone to the Link module of the tablet.

S504: The Link module of the tablet sends the static service information of the mobile phone to a Device Profile of the tablet.

In the related description in FIG. 4, the Device Profile is located at a device connection layer of the tablet, and is a service interface that can be invoked by a service layer. For example, the service layer of the tablet may read or update a trusted device list of the tablet by invoking the Device Profile. The trusted device list of the tablet includes an identifier and static service information of another terminal device that is in a same trusted device ring as the tablet.

S505: The Device Profile of the tablet updates the trusted device list of the tablet based on the static service information of the mobile phone.

That is, the Device Profile of the tablet adds the received static service information of the mobile phone to the trusted device list of the tablet, and deletes static service information of the mobile phone that is originally stored in the trusted device list of the tablet, to ensure timeliness of the trusted device list.

Figure 6:
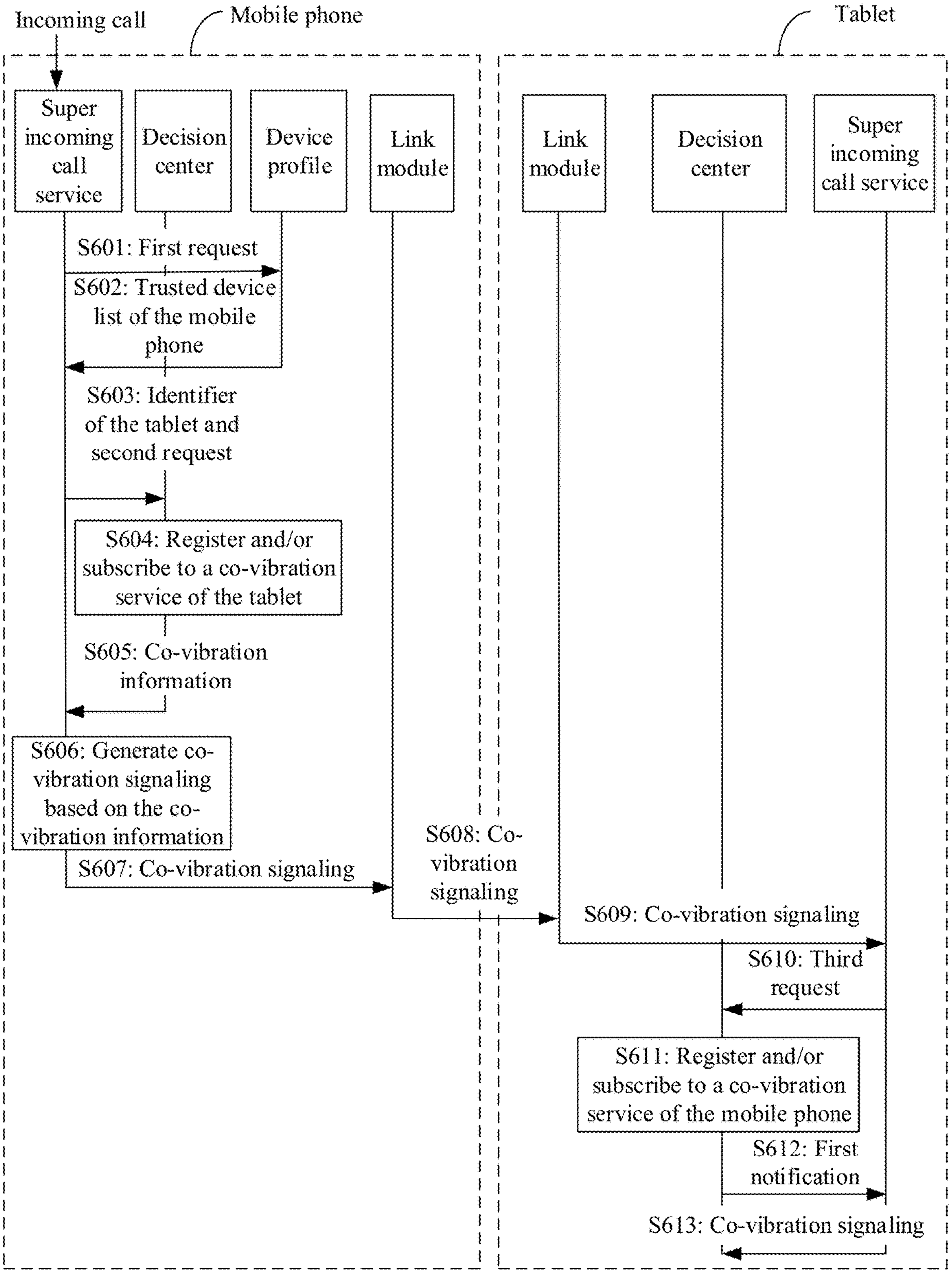
FIG. 6 is a schematic diagram of an incoming call synchronization method according to an embodiment of this application.

When the mobile phone receives an incoming call, the mobile phone may synchronize the incoming call to the tablet based on static service information of the tablet in a trusted device list of the mobile phone. FIG. 6 is a schematic diagram of an incoming call synchronization method according to an embodiment of this application. As shown in FIG. 6, the incoming call synchronization process may include S601 to S613.

S601: A super incoming call service of a mobile phone sends a first request to a Device Profile of the mobile phone in response to receiving an incoming call. The first request is used to query a trusted device list of the mobile phone. The trusted device list of the mobile phone includes an identifier of a tablet and static service information of the tablet.

Referring to the related description in FIG. 4, the super incoming call service of the mobile phone is a service provided by a service layer of the mobile phone. The Device Profile of the mobile phone is a service provided by a device connection layer of the mobile phone.

S602: The Device Profile of the mobile phone sends the trusted device list of the mobile phone to the super incoming call service of the mobile phone in response to receiving the first request.

S603: The super incoming call service of the mobile phone sends the identifier of the tablet and a second request to a decision center of the mobile phone. The second request is used to request the decision center to register and/or subscribe to a co-vibration service of the tablet.

Referring to the related description in FIG. 4, the decision center of the mobile phone may be located in a hyper terminal center of the mobile phone.

For example, the decision center of the mobile phone may register and/or subscribe to the co-vibration service of the tablet based on the identifier of the tablet. After registration and/or subscription succeed/succeeds, the tablet may receive co-vibration signaling sent after the mobile phone receives the incoming call, to synchronously give an incoming call notification.

S604: The decision center of the mobile phone registers and/or subscribes to the co-vibration service of the tablet in response to receiving the second request.

S605: The decision center of the mobile phone sends co-vibration information to the super incoming call service of the mobile phone. The co-vibration information may include the identifier of the tablet.

S606: The super incoming call service of the mobile phone generates co-vibration signaling based on the co-vibration information. The co-vibration signaling is used to indicate the tablet and the mobile phone to synchronously give an incoming call notification.

The co-vibration signaling may include an identifier of the mobile phone, so that after receiving the co-vibration signaling, the tablet may identify that the mobile phone requests the tablet to synchronously give an incoming call notification.

S607: The super incoming call service of the mobile phone sends the co-vibration signaling to a Link module of the mobile phone.

S608: The Link module of the mobile phone sends the co-vibration signaling to a Link module of the tablet.

S609: The Link module of the tablet sends the co-vibration signaling to a super incoming call service of the tablet.

S610: The super incoming call service of the tablet sends a third request to a decision center of the tablet based on the co-vibration signaling. The third request is used to request the decision center of the tablet to register and/or subscribe to a co-vibration service of the mobile phone.

For example, the decision center of the tablet may register and/or subscribe to the co-vibration service of the mobile phone based on the identifier of the mobile phone in the co-vibration signaling. After registering and/or subscribing to the co-vibration service of the mobile phone, the tablet may synchronously give an incoming call notification based on the co-vibration signaling sent after the mobile phone receives the incoming call.

S611: The decision center of the tablet registers and/or subscribes to the co-vibration service of the mobile phone in response to receiving the third request.

S612: The decision center of the tablet sends a first notification to the super incoming call service of the tablet, where the first notification is used to indicate that the decision center of the tablet has successfully registered and/or subscribed to the co-vibration service of the mobile phone.

S613: The super incoming call service of the tablet sends the co-vibration signaling to the decision center of the tablet in response to receiving the first notification.

In S601 to S613, a process in which the mobile phone synchronizes the incoming call to the tablet is described by using an example in which a trusted device ring includes the mobile phone and the tablet. In some embodiments, the trusted device ring may further include other terminal devices such as a PC, a watch, and a headset. A process in which the mobile phone synchronizes an incoming call to these terminal devices is similar to that in S601 to S613. Details are not described herein.

After receiving the co-vibration signaling, the decision center of the tablet may determine an incoming call notification manner by using the incoming call notification method provided in the embodiments of this application, to give an incoming call notification.

The incoming call notification method provided in the embodiments of this application is described below. The incoming call notification method provided in the embodiments of this application may be applied to any first device in a trusted device ring. The trusted device ring may include the first device and a second device. The second device is a terminal device that receives an incoming call, and the first device is another terminal device other than the second device in the trusted device ring. There may be one or more first devices.

For example, the first devices may include a tablet, a computer, a watch, and a headset, and the second device may be a mobile phone, a tablet with a call function, or a watch with a call function. After receiving the incoming call, the second device sends co-vibration signaling to a decision center of the first device by using the incoming call synchronization process in S601 to S613.

It should be noted that when receiving the incoming call, the second device notifies the incoming call in a preset incoming call notification manner.

In some embodiments, the preset incoming call notification manner may be: Before the terminal device gives an incoming call notification, the terminal device receives an operation instruction of a user, and sets the incoming call notification manner based on the operation instruction of the user.

That is, the preset incoming call notification manner may be an incoming call notification manner locally set by the user in the terminal device before the terminal device gives an incoming call notification. For example, the terminal device is a tablet. Before the tablet gives an incoming call notification, the user sets an incoming call notification manner of the tablet to ringing. In this case, the incoming call notification manner preset in the tablet is ringing.

In some other embodiments, the preset incoming call notification manner may alternatively be an incoming call notification manner used by default by an operating system of the terminal device.

In the embodiments of this application, the preset incoming call notification manner may also be referred to as a preset incoming call notification manner.

Figure 7:
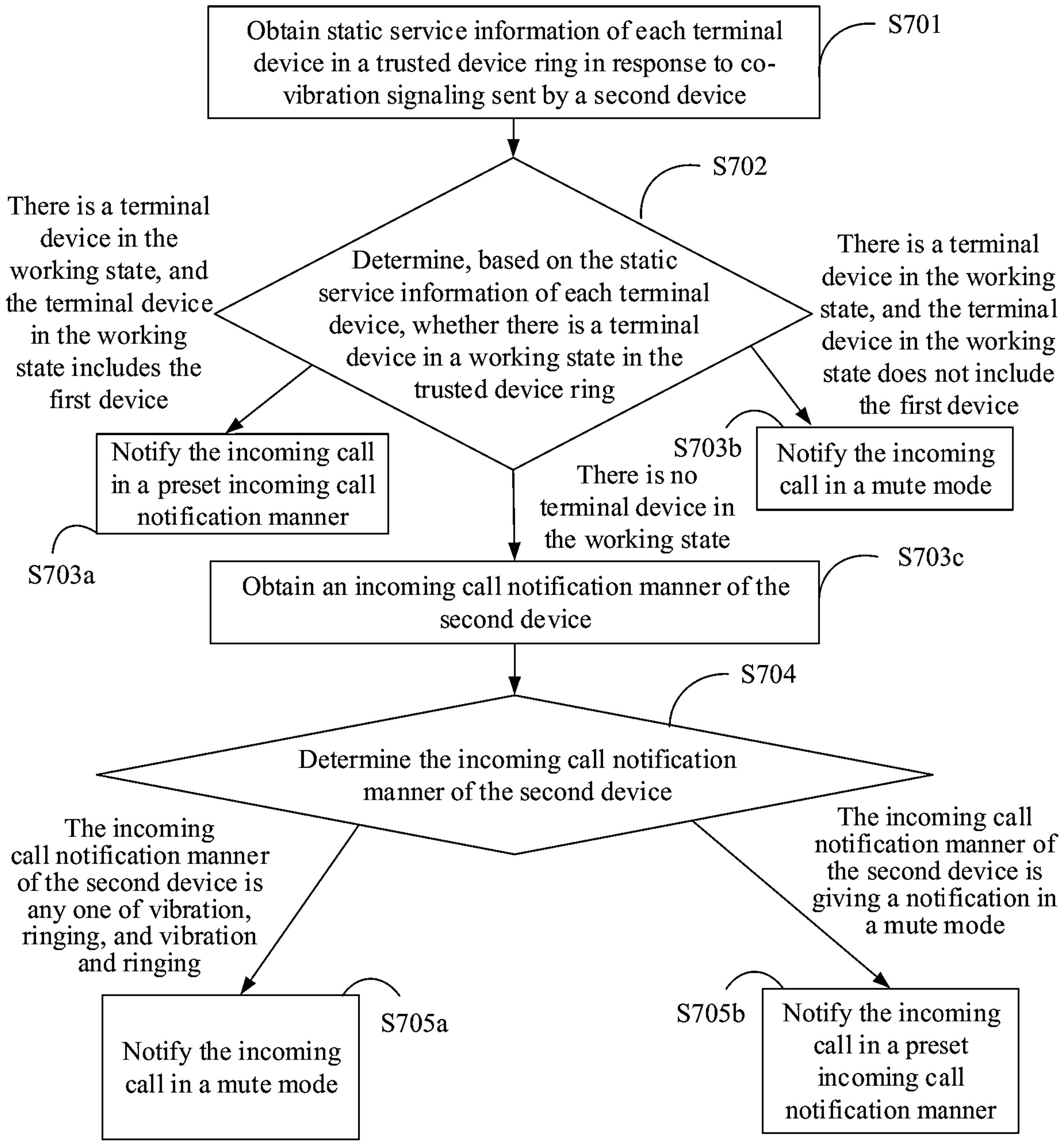
FIG. 7 is a flowchart of an incoming call notification method according to an embodiment of this application.

FIG. 7 is a flowchart of an incoming call notification method according to an embodiment of this application. As shown in FIG. 7, the incoming call notification method may include S701 to S705. S705 herein includes S705*a* and S705*b*.

S701: Obtain static service information of each terminal device in a trusted device ring in response to co-vibration signaling sent by a second device.

The co-vibration signaling may also be referred to as first signaling, and is used to indicate a first device to give an incoming call notification. For related description of the co-vibration signaling, refer to S601 to S613. Details are not described herein.

For example, first devices include a tablet, a computer, and a watch, and the second device is a mobile phone, and the incoming call notification method provided in this embodiment of this application is applied to the tablet in the first device. S701 is as follows: A decision center of the tablet obtains static service information of the computer, static service information of the watch, and static service information of the mobile phone in response to receiving the co-vibration signaling sent by the mobile phone.

Refer to the description of the static service information in the related description in FIG. 4. The static service information of the terminal device may include Profile information, device use state information, an incoming call notification manner, and the like of the terminal device.

The device use state information may indicate whether the corresponding terminal device is currently in a working state. In an example, the working state of the terminal device may include at least one of the following: a screen-on state, an input state, an output state, and the like. The input state is used to indicate that the terminal device is in a state of receiving an information input, and an information input manner may include keyboard input, mouse input, touch input, audio/video data input, or the like. The output state is used to indicate that the terminal device is in an information output state, and an information output manner may include audio/video output, display output, or the like.

The incoming call notification manner may include giving a notification in a mute mode, ringing, vibration, vibration and ringing (vibration on ring), or the like. The giving a notification in the mute mode may be displaying an incoming call notification interface in the mute mode. That is, in the giving a notification in the mute mode, the incoming call notification interface is displayed, but ringing, vibration, or vibration on ring is not performed.

In this embodiment of this application, that the device is in a working state may also be referred to as that the device meets a first preset condition.

In some embodiments, the decision center of the tablet may obtain the static service information of the computer, the static service information of the watch, and the static service information of the mobile phone by querying a trusted device list of the tablet. Referring to S505, the trusted device list of the tablet stores static service information of a terminal device that is in a same trusted device ring as the tablet.

In some other embodiments, the decision center of the tablet may obtain the static service information of the computer, the static service information of the watch, and the static service information of the mobile phone by performing S501 to S505.

S702: Determine, based on the static service information of each terminal device, whether there is a terminal device in a working state in the trusted device ring, and if there is a terminal device in the working state, and the terminal device in the working state includes the first device, perform S703*a*; if there is a terminal device in the working state, and the terminal device in the working state does not include the first device, perform S703*b*; or if there is no terminal device in the working state, perform S703*c*.

In this embodiment of this application, when a device that meets the first preset condition exists in the first device and the second device, the device that meets the first preset condition may be referred to as a third device. When a device that meets the first preset condition exists in the first device and the second device, a device that does not meet the first preset condition in the first device may be referred to as a fourth device.

The example in S701 is used, that is, the first devices include the tablet, the computer, and the watch, and the incoming call notification method provided in this embodiment of this application is applied to the tablet in the first devices. For example, the decision center of the tablet determines, based on the static service information of the computer, the static service information of the watch, and the static service information of the mobile phone, whether there is a terminal device in a working state in the trusted device ring. If the tablet is in the working state. S703*a* is performed; if at least one of the computer, the watch, or the mobile phone is in the working state, and the tablet is not in the working state. S703*b* is performed; or if there is no terminal device in the working state. S703*c* is performed.

S703*a*: Notify the incoming call in a preset incoming call notification manner.

The example in S701 is still used, and an incoming call notification manner preset in the tablet is ringing. If determining that the tablet is in the working state, the decision center of the tablet sends a ring indication to a call UI of the tablet, and the call UI of the tablet displays an incoming call interface UI based on the ring indication, and notifies the incoming call through ringing. The incoming call interface UI may also be referred to as an incoming call UI.

S703*b*: Notify the incoming call in a mute mode.

The example in S701 is still used. If the decision center of the tablet determines that there is a terminal device in the working state in the trusted device ring, and the tablet is not in the working state, the decision center of the tablet sends a mute indication to a call UI of the tablet, and the call UI of the tablet displays an incoming call interface UI based on the mute indication, and notifies the incoming call in the mute mode.

Figure 8:
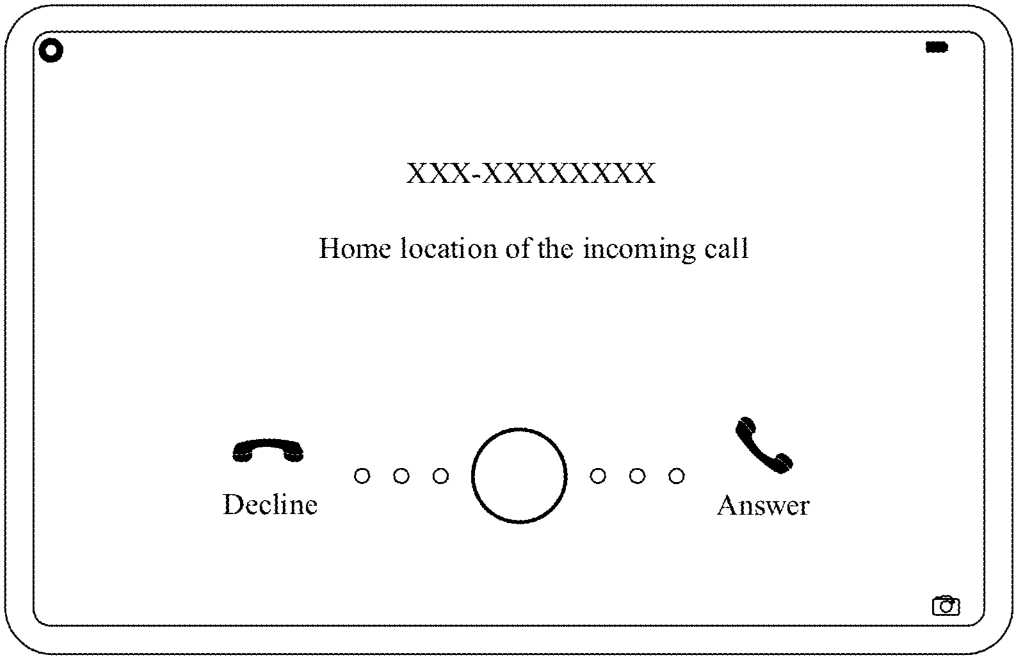
FIG. 8 is a schematic diagram of notifying an incoming call by a tablet by using an incoming call UI according to an embodiment of this application.

A manner of notifying the incoming call in the mute mode may be notifying the incoming call by using a banner, notifying the incoming call by using a bubble, notifying the incoming call by using an incoming call UI, or the like. FIG. 8 is a schematic diagram of notifying an incoming call by a tablet by using an incoming call UI according to an embodiment of this application. As shown in FIG. 8, the incoming call UI may include an answer control, a decline control, and text for displaying incoming call-related information. The incoming call-related text may include a calling number, a home location of the incoming call, a name of a calling device, a remark, and the like. This is not specifically limited herein.

In this embodiment of this application, the answer control may also be referred to as a first control, and the decline control may also be referred to as a second control. An operation performed by a user on the first control may be an answer operation, and an operation performed by the user on the second control may be a decline operation.

It should be noted that in this case, the incoming call notification manner preset in the tablet may be ringing, vibration, vibration on ring, or the like. The tablet does not give an incoming call notification in the preset incoming call notification manner.

Figure 9:
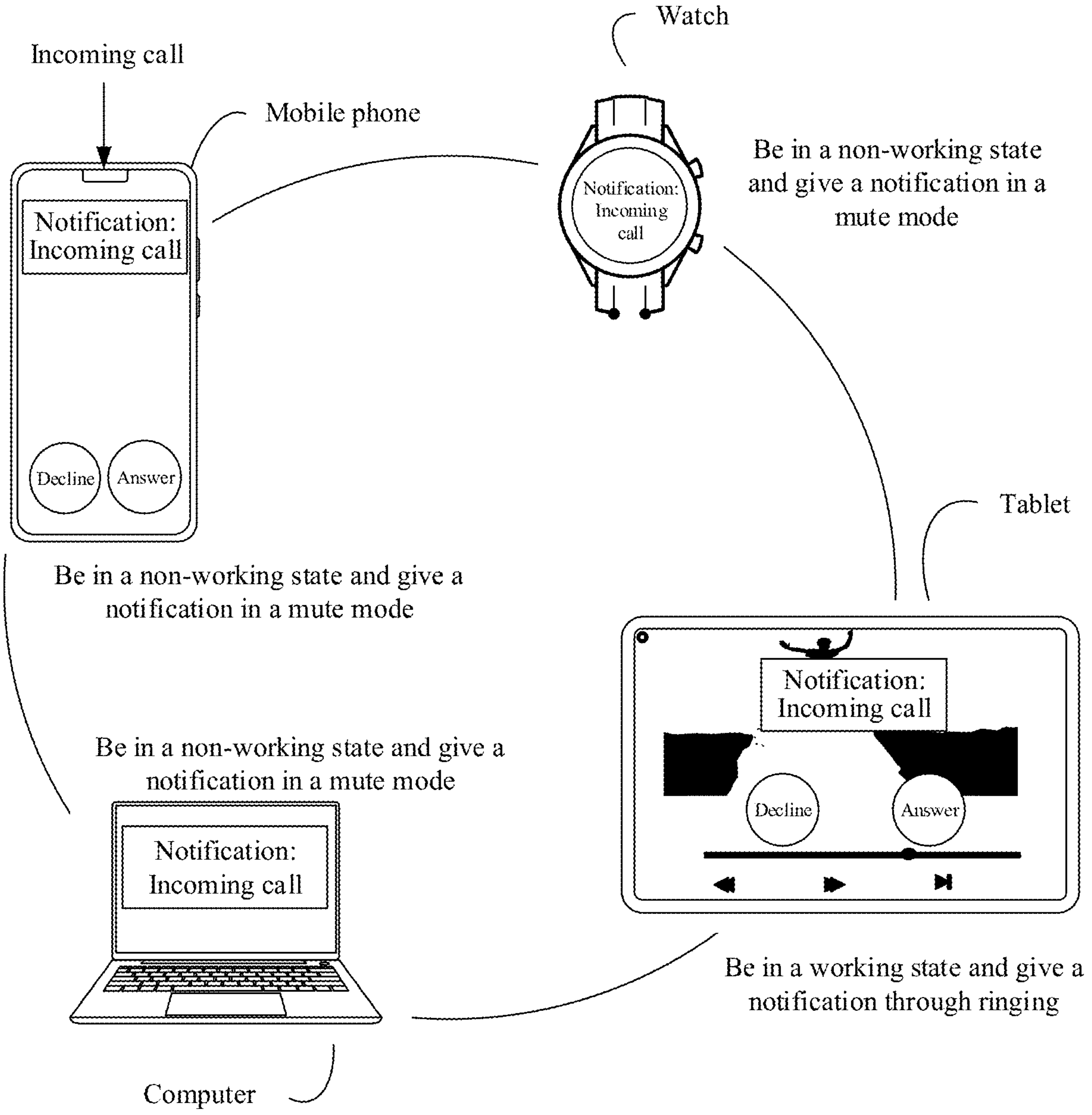
FIG. 9 is a schematic diagram of an incoming call scenario according to an embodiment of this application.

S703*a* and S703*b* are described herein with reference to a specific incoming call scenario. FIG. 9 is a schematic diagram of an incoming call scenario according to an embodiment of this application. In the incoming call scenario, a trusted device ring includes a mobile phone, a tablet, a computer, and a watch. The mobile phone is a terminal device that receives an incoming call, namely, a second device. The tablet, the computer, and the watch are first devices. The tablet is playing a movie, that is, is in a working state. None of the mobile phone, the computer, and the watch is in the working state. Incoming call notification manners preset in the mobile phone and the computer are giving a notification in a mute mode, an incoming call notification manner preset in the tablet is ringing, and an incoming call notification manner preset in the watch is vibration.

When receiving an incoming call, the mobile phone sends co-vibration signaling to each of the computer, the tablet, and the watch.

The computer receives the co-vibration signaling, and determines, by performing S701 and S702, that the tablet is in the working state, and the computer is not in the working state. In this case, the computer notifies the incoming call in the mute mode.

The tablet receives the co-vibration signaling, and determines, by performing S701 and S702, that the tablet is in the working state. In this case, the tablet notifies the incoming call in the preset incoming call notification manner, that is, through ringing. For example, as shown in FIG. 9, the tablet may display an incoming call UI at an upper layer of the played movie, and notify the incoming call through ringing.

The watch receives the co-vibration signaling, and determines, by performing S701 and S702, that the tablet is in the working state, and the watch is not in the working state. In this case, the watch notifies the incoming call in the mute mode.

The mobile phone notifies the incoming call in the preset incoming call notification manner, that is, notifies the incoming call in the mute mode.

That is, when the mobile phone receives an incoming call, if the tablet is in the working state, a terminal device other than the tablet and the mobile phone in the trusted device ring notifies the incoming call only in the mute mode regardless of an incoming call notification manner preset in the terminal device, and only the mobile phone and the tablet notify the incoming call in the preset incoming call notification manners. In this way, it can be ensured that the user can learn of the incoming call in a timely manner, and disturbance of the incoming call notification to the user is reduced.

S703*c*: Obtain an incoming call notification manner of the second device.

In the related description in FIG. 4, an incoming call notification manner of a terminal device may be stored in static service information of the terminal device, and the incoming call notification manner is an incoming call notification manner preset in the corresponding terminal device. Terminal devices in a same trusted device ring may exchange static service information based on a near field communication connection, that is, in the terminal devices in the same trusted device ring, an incoming call notification manner preset in a peer device may be learned by obtaining static service information of the peer device.

The example in S701 is still used. If the decision center of the tablet determines that there is no terminal device in the working state in the trusted device ring, an incoming call notification manner of the mobile phone may be obtained based on the static service information of the mobile phone. After obtaining the incoming call notification manner of the mobile phone, the decision center of the tablet may determine an incoming call notification manner of the tablet based on the incoming call notification manner of the mobile phone. The incoming call notification manner of the mobile phone is the foregoing incoming call notification manner preset in the mobile phone.

S704: Determine the incoming call notification manner of the second device. If the incoming call notification manner of the second device is any one of vibration, ringing, and vibration on ring. S705*a* is performed; or if the incoming call notification manner of the second device is giving a notification in a mute mode, S705*b* is performed.

S705*a*: Notify the incoming call in a mute mode.

The example in S701 is still used. If determining that the incoming call notification manner of the mobile phone is any one of vibration, ringing, and vibration on ring, the decision center of the tablet sends a mute indication to a call UI of the tablet, and the call UI of the tablet displays an incoming call interface UI based on the mute indication, and notifies the incoming call in the mute mode.

In this way, the incoming call notification performed by the mobile phone is sufficient to enable the user to learn of the incoming call, and disturbance of the incoming call notification to the user can be reduced when the tablet notifies the incoming call in the mute mode.

Figure 10:
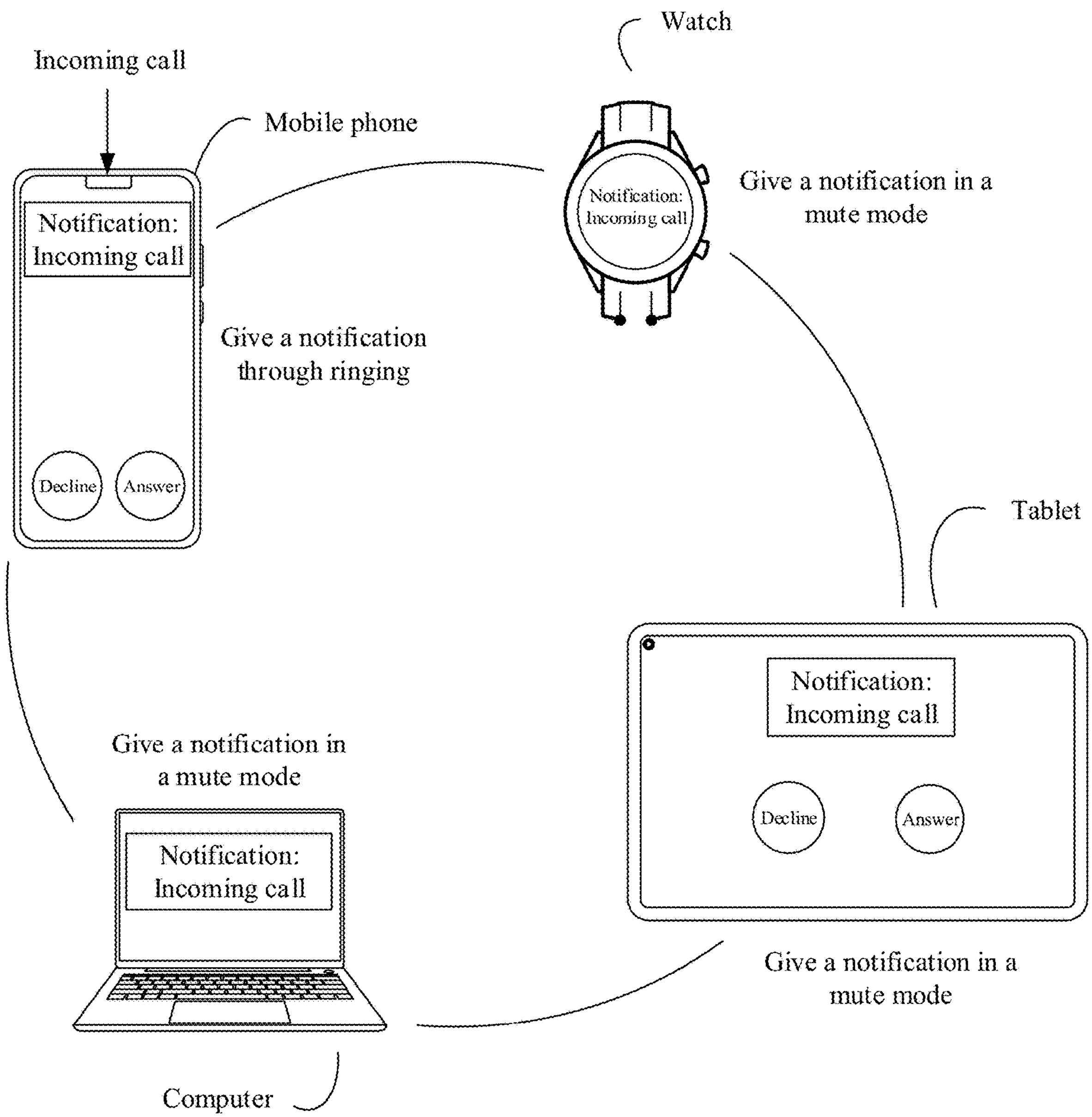
FIG. 10 is a schematic diagram of another incoming call scenario according to an embodiment of this application.

S705*a* is described herein with reference to a specific incoming call scenario. FIG. 10 is a schematic diagram of another incoming call scenario according to an embodiment of this application. In the incoming call scenario, a trusted device ring includes a mobile phone, a tablet, a computer, and a watch. The mobile phone is a terminal device that receives an incoming call, namely, a second device. The tablet, the computer, and the watch are first devices. None of the mobile phone, the tablet, the computer, and the watch is in a working state. An incoming call notification manner preset in the mobile phone is ringing, incoming call notification manners preset in the computer and the tablet are ringing, and an incoming call notification manner preset in the watch is vibration.

When receiving an incoming call, the mobile phone sends co-vibration signaling to each of the computer, the tablet, and the watch.

The computer, the tablet, and the watch receive the co-vibration signaling, and determine, by performing S701 to S704, that none of the mobile phone, the tablet, the computer, and the watch is in the working state, and the incoming call notification manner preset in the mobile phone is ringing. In this case, each of the computer, the tablet, and the watch notifies the incoming call in a mute mode.

The mobile phone notifies the incoming call in the preset incoming call notification manner, that is, through ringing.

That is, when the mobile phone receives an incoming call, if none of the mobile phone, the tablet, the computer, and the watch is in the working state, and the incoming call notification manner preset in the mobile phone is ringing, a terminal device other than the mobile phone in the trusted device ring notifies the incoming call only in the mute mode regardless of an incoming call notification manner preset in the terminal device, and only the mobile phone notifies the incoming call in the preset incoming call notification manner. In this way, it can be ensured that the user can learn of the incoming call in a timely manner, and disturbance of the incoming call notification to the user is reduced.

S705*b*: Notify the incoming call in a preset incoming call notification manner.

The example in S701 is still used, and an incoming call notification manner preset in the tablet is ringing. If the decision center of the tablet determines that none of the mobile phone, the tablet, the computer, and the watch is in the working state, and the incoming call notification manner preset in the mobile phone is giving a notification in a mute mode, the decision center of the tablet sends a ring indication to a call UI of the tablet, and the call UI of the tablet displays an incoming call interface UI based on the ring indication, and notifies the incoming call through ringing.

Figure 11:
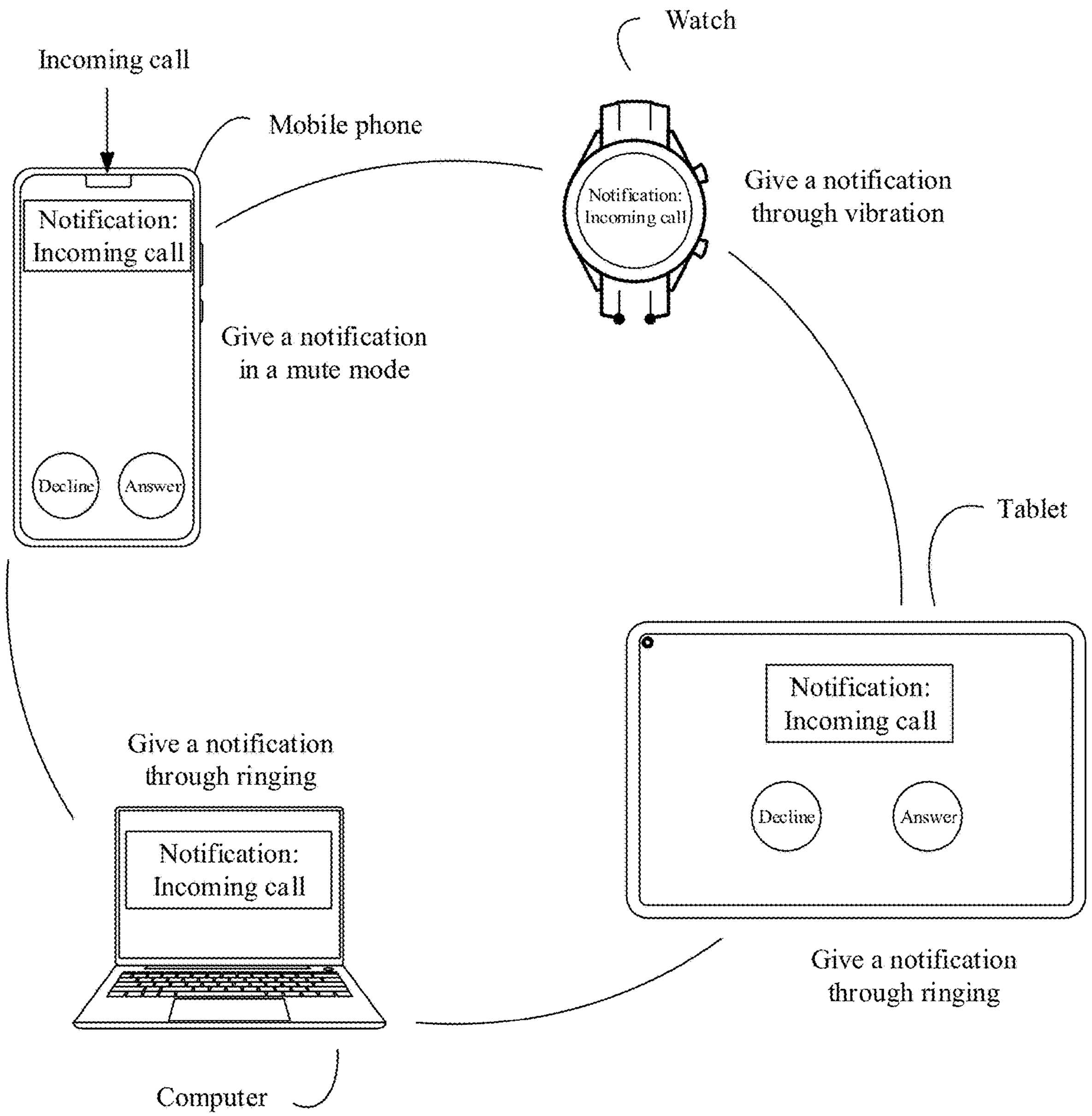
FIG. 11 is a schematic diagram of another incoming call scenario according to an embodiment of this application.

S705*b* is described herein with reference to a specific incoming call scenario. FIG. 11 is a schematic diagram of another incoming call scenario according to an embodiment of this application. In the incoming call scenario, a trusted device ring includes a mobile phone, a tablet, a computer, and a watch. The mobile phone is a terminal device that receives an incoming call, namely, a second device. The tablet, the computer, and the watch are first devices. None of the mobile phone, the tablet, the computer, and the watch is in a working state. An incoming call notification manner preset in the mobile phone is giving a notification in a mute mode, incoming call notification manners preset in the computer and the tablet are ringing, and an incoming call notification manner preset in the watch is vibration.

When receiving an incoming call, the mobile phone sends co-vibration signaling to each of the computer, the tablet, and the watch.

The computer receives the co-vibration signaling, and determines, by performing S701 to S704, that none of the mobile phone, the tablet, the computer, and the watch is in the working state, and the incoming call notification manner preset in the mobile phone is giving a notification in the mute mode. In this case, the computer notifies the incoming call in the preset incoming call notification manner, that is, through ringing.

The tablet receives the co-vibration signaling, and determines, by performing S701 to S704, that none of the mobile phone, the tablet, the computer, and the watch is in the working state, and the incoming call notification manner preset in the mobile phone is giving a notification in the mute mode. In this case, the tablet notifies the incoming call in the preset incoming call notification manner, that is, through ringing.

The watch receives the co-vibration signaling, and determines, by performing S701 to S704, that none of the mobile phone, the tablet, the computer, and the watch is in the working state, and the incoming call notification manner preset in the mobile phone is giving a notification in the mute mode. In this case, the watch notifies the incoming call in the preset incoming call notification manner, that is, through vibration.

The mobile phone notifies the incoming call in the preset incoming call notification manner, that is, notifies the incoming call in the mute mode.

That is, when the mobile phone receives an incoming call, if none of the mobile phone, the tablet, the computer, and the watch is in the working state, and the incoming call notification manner preset in the mobile phone is giving a notification in the mute mode, all terminal devices in the trusted device ring notify the incoming call in preset incoming call notification manners. In this way, it can be ensured that the user learns of the incoming call in a timely manner when the mobile phone is in the mute mode.

When the first device receives the co-vibration signaling, if the first device is on a call, for example, answers an incoming call from another terminal device, or makes a call to another device, or the terminal device is performing multi-screen coordination with another terminal device, the incoming call being answered or the multi-screen coordination being performed is interfered with if incoming call notification is still performed. That the terminal device is answering an incoming call from another terminal device may also be referred to as that the terminal device is in a call state. That the terminal device is performing multi-screen coordination may also be referred to as that the terminal device is in a multi-screen coordination state. That the terminal device is in a call state or that the terminal device is in a multi-screen coordination state may be collectively referred to as that the terminal device is in a coordination state.

Figure 12:
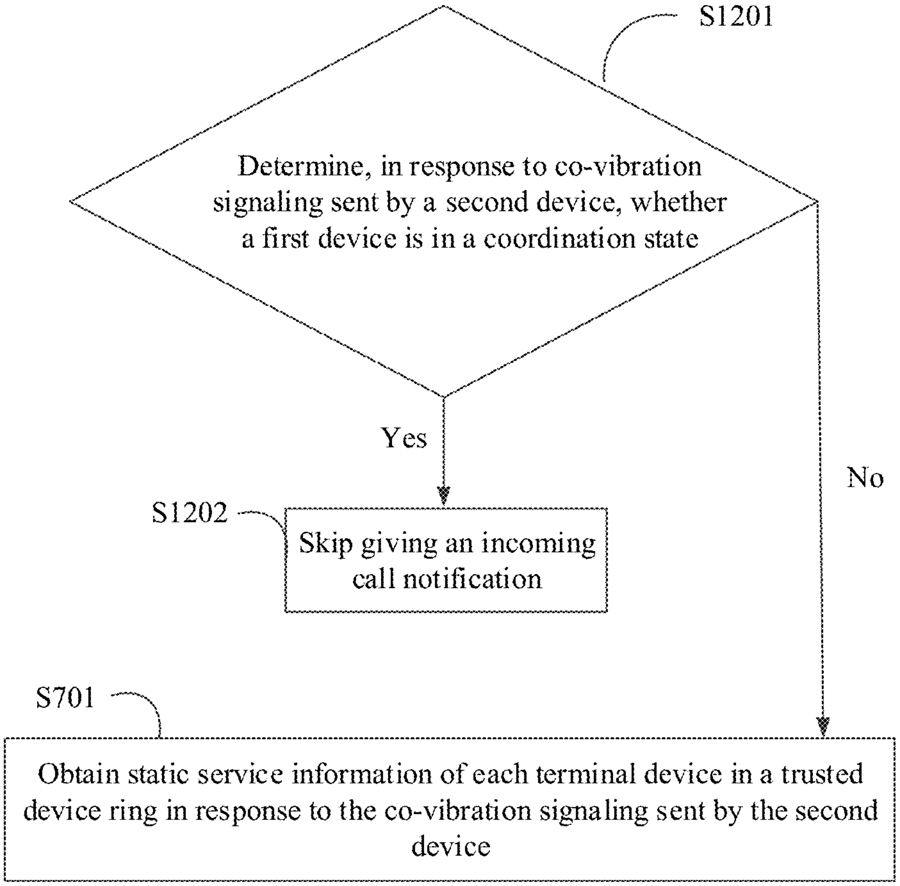
FIG. 12 is a schematic diagram of another incoming call notification method according to an embodiment of this application.

Before S701, that is, before the first device obtains the static service information of each terminal device in the trusted device ring, the first device may first determine whether the first device is in the coordination state, and determine, based on a determining result, whether to give an incoming call notification. FIG. 12 is a schematic diagram of another incoming call notification method according to an embodiment of this application. As shown in FIG. 12, before S701 shown in FIG. 7, the incoming call notification method provided in this embodiment of this application further includes S1201 and S1202.

S1201: Determine, in response to co-vibration signaling sent by a second device, whether a first device is in a coordination state. S1202 is performed if the first device is in the coordination state; or S701 is performed if the first device is not in the coordination state.

S1202: Skip giving an incoming call notification if the first device is in the coordination state. That is, when determining that the first device is in the coordination state, the first device may not give an incoming call notification, to reduce disturbance to a user. For example, the first device is a tablet. Before performing S701, the tablet may determine whether the tablet is in a call state or whether the tablet is performing multi-screen coordination with another terminal device. The tablet may not give an incoming call notification if the tablet is in the call state or the tablet is performing multi-screen coordination with the another terminal device. In this way, disturbance of the incoming call to the user can be reduced, to improve user experience. It should be specially noted that in this embodiment of this application, the skipping of giving an incoming call notification is completely different from giving a notification in a mute mode. That the terminal device does not give an incoming call notification means that the terminal device does not perform notification in any manner, and the giving a notification in the mute mode may include performing notification by using a banner, performing notification by using a bubble, performing notification by popping up a window, or the like. In some other embodiments, a Do Not Disturb mode may be further set in the terminal device. The Do Not Disturb mode is a working mode of the terminal device. The terminal device may receive an operation instruction of the user and enter the Do Not Disturb mode. When the terminal device is in the Do Not Disturb mode, functions such as incoming call notification. SMS notification, and message notification are disabled.

In the Do Not Disturb mode, a whitelist may be set, and the whitelist may include an application, a phone number, or an identifier of another terminal device. When the terminal device is in the Do Not Disturb mode, the application, the phone number, or the incoming call notification, the SMS notification, or the message notification of the terminal device in the whitelist is not disabled.

In the Do Not Disturb mode, a Do Not Disturb rule may be further set. When the terminal device is in the Do Not Disturb mode, a phone number or the incoming call notification of the terminal device that does not meet the Do Not Disturb rule is not disabled. For example, the Do Not Disturb rule of the terminal device includes that there are less than three incoming calls in 5 minutes. In this case, when the terminal device receives an incoming call from a same terminal device for the third time in 5 minutes, the terminal device gives an incoming call notification.

In this embodiment of this application, after determining an incoming call notification manner, the first device may determine whether the first device is in the Do Not Disturb mode, whether the whitelist includes a device identifier of a third device that initiates an incoming call, and whether the incoming call from the third device meets the Do Not Disturb rule. The device identifier of the third device may be included in the co-vibration signaling.

The first device may determine, based on a determining result, whether to give an incoming call notification. This is described below in detail.

Figure 13:
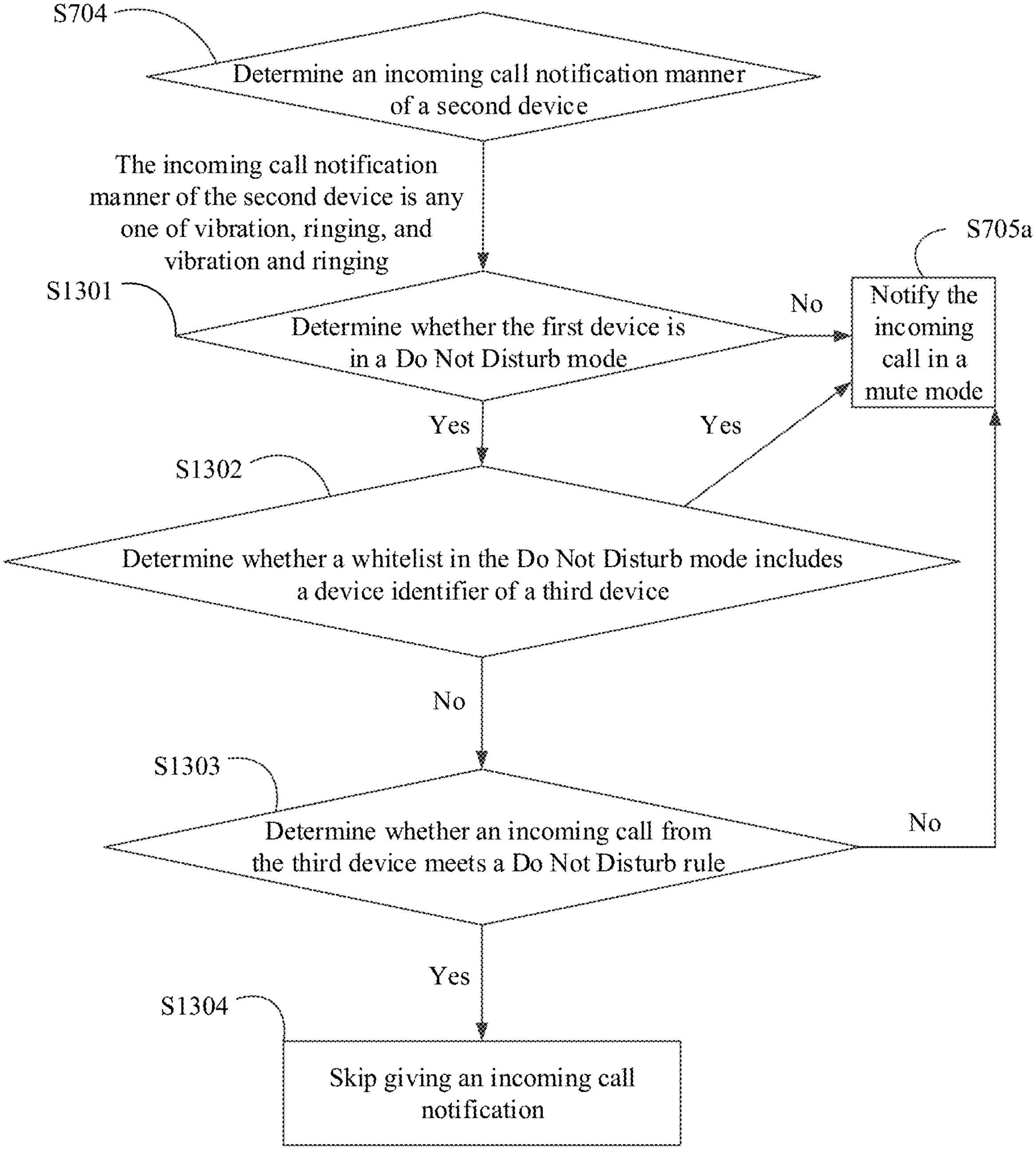
FIG. 13 is a flowchart of another incoming call notification method according to an embodiment of this application.

FIG. 13 is a flowchart of another incoming call notification method according to an embodiment of this application. As shown in FIG. 13, before S705*a* and after S704 shown in FIG. 7, the incoming call notification method provided in this embodiment of this application further includes S1301 to S1304.

S1301: Determine whether the first device is in a Do Not Disturb mode. S1302 is performed if the first device is in the Do Not Disturb mode; or S705*a* is performed if the first device is not in the Do Not Disturb mode.

S1302: Determine whether a whitelist in the Do Not Disturb mode includes a device identifier of a third device. S1303 is performed if the whitelist in the Do Not Disturb mode includes the device identifier of the third device; or S705*a* is performed if the whitelist in the Do Not Disturb mode does not include the device identifier of the third device.

S1303: Determine whether an incoming call from the third device meets a Do Not Disturb rule. S1304 is performed if the incoming call from the third device meets the Do Not Disturb rule; or S705*a* is performed if the incoming call from the third device does not meet the Do Not Disturb rule.

S1304: Skip giving an incoming call notification.

Figure 14:
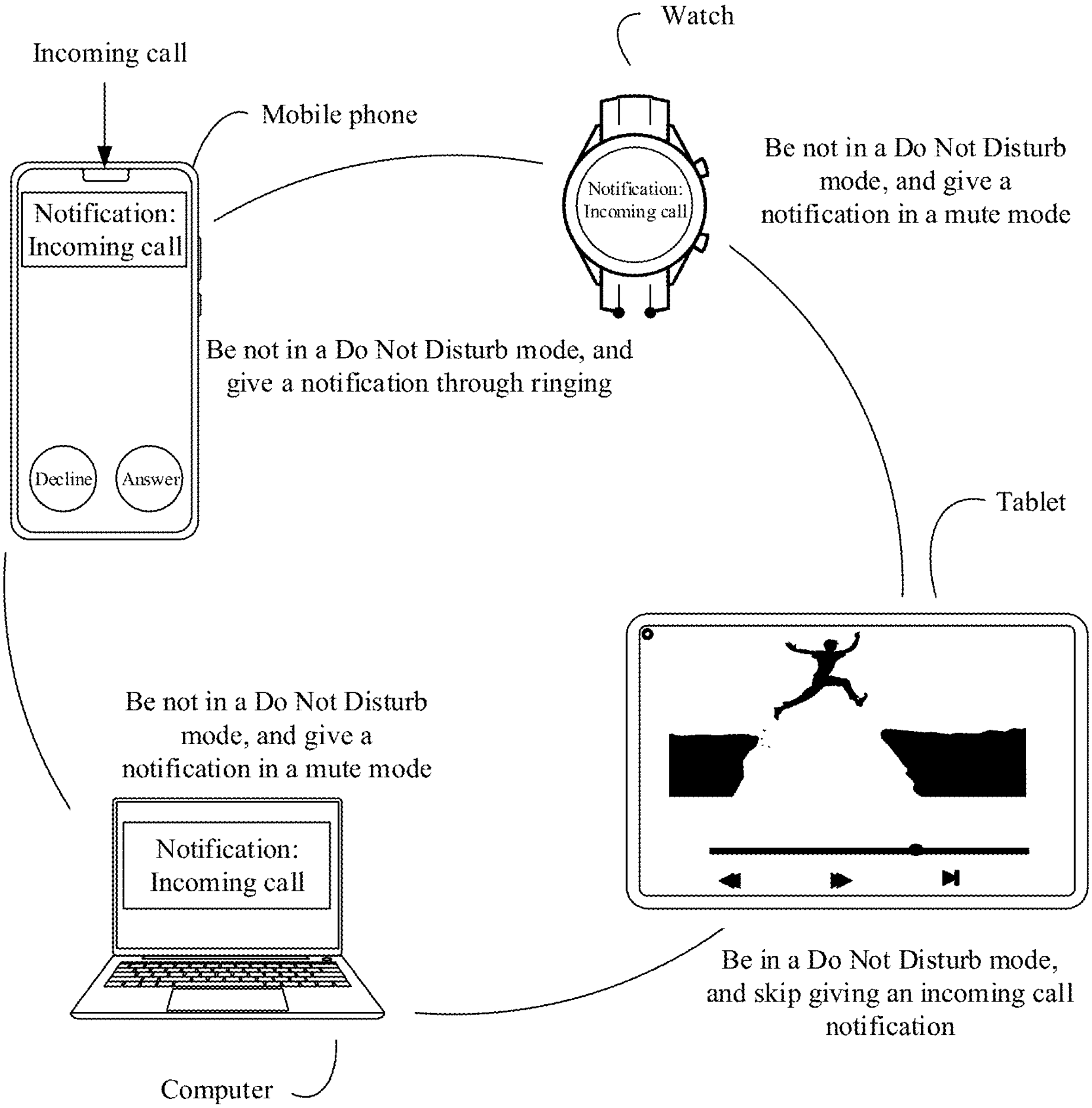
FIG. 14 is a schematic diagram of another incoming call scenario according to an embodiment of this application.

S1301 to S1304 are described herein with reference to a specific incoming call scenario. FIG. 14 is a schematic diagram of another incoming call scenario according to an embodiment of this application. In the incoming call scenario, a trusted device ring includes a mobile phone 1, a tablet, a computer, and a watch. The mobile phone 1 is a terminal device that receives an incoming call, namely, a second device. The tablet, the computer, and the watch are first devices. A third device that initiates an incoming call to the mobile phone 1 is a mobile phone 2.

None of the mobile phone 1, the computer, and the watch is in a Do Not Disturb mode, and the tablet is playing a movie, and is in a Do Not Disturb mode. A whitelist in the Do Not Disturb mode of the tablet does not include an identifier of the third device. A Do Not Disturb rule in the Do Not Disturb mode of the tablet is that there are less than three incoming calls in 5 minutes. An incoming call notification manner preset in the mobile phone 1 is ringing.

When receiving a first incoming call from the mobile phone 2 in 5 minutes, the mobile phone 1 sends co-vibration signaling to each of the computer, the tablet, and the watch.

The tablet receives the co-vibration signaling, determines, by performing S1301, that the tablet is in the Do Not Disturb mode, determines, by performing S1302, that the whitelist does not include the identifier of the third device, and determines, by performing S1303, that the incoming call from the mobile phone 2 meets the Do Not Disturb rule. In this case, the tablet does not give an incoming call notification for the incoming call.

The computer and the watch receive the co-vibration signaling, and determine, by performing S1301, that the computer and the watch are not in the Do Not Disturb mode. In this case, the computer and the watch perform S705*a*, that is, give an incoming call notification in a mute mode.

The mobile phone notifies the incoming call in the preset incoming call notification manner, that is, through ringing.

That is, when the mobile phone receives an incoming call, if the tablet is in the Do Not Disturb mode, the third device is not in the whitelist, and the incoming call meets the Do Not Disturb rule, the tablet does not give an incoming call notification regardless of an incoming call notification manner preset in the tablet. In this way, disturbance of the incoming call notification to the user can be reduced, to improve intelligence of the incoming call notification.

It may be understood that S1301 to S1304 may be performed before S705*b* and after S704. In this case. S1301 to S1304 and S705*a* in the related description may be replaced with S705*b*. S1301 to S1304 may be performed before S703*a* and after S702. In this case. S1301 to S1304 and S705*a* in the related description may be replaced with S703*a*. S1301 to S1304 may be performed before S703*b* and after S702. In this case. S1301 to S1304 and S705*a* in the related description may be replaced with S703*b*.

The incoming call notification method provided in the embodiments of this application is described above. It may be understood that with reference to the foregoing description, the incoming call notification method provided in the embodiments of this application can ensure that a user learns of an incoming call in a timely manner and disturbance to the user is reduced, has relatively high intelligence, and is applicable to relatively rich scenarios.

An incoming call notification system provided in an embodiment of this application is described below:

The incoming call notification system provided in this embodiment of this application includes a first device and a second device, and there are one or more first devices. The second device is configured to receive an incoming call request. When a third device that meets a first preset condition exists in the first device, the third device is configured to: respond to the incoming call request, and give an incoming call notification in an incoming call notification manner preset in the third device. The first preset condition includes at least one of the following cases: a screen-on state, an input state, and an output state. When the third device exists in the first device and the second device, a fourth device that does not meet the first preset condition in the first device is configured to give an incoming call notification in a mute mode.

Figure 15:
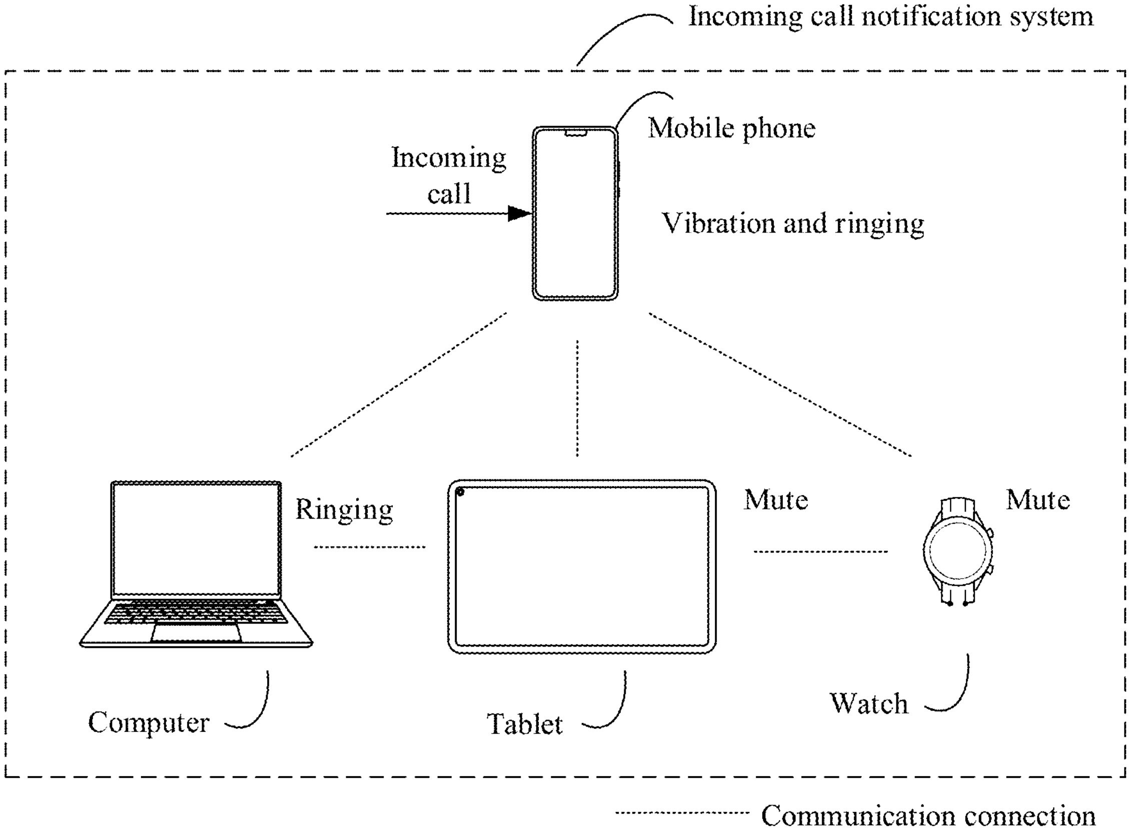
FIG. 15 is a schematic diagram of an incoming call notification system according to an embodiment of this application.

FIG. 15 is a schematic diagram of an incoming call notification system according to an embodiment of this application. For ease of representation, in FIG. 15, a second device is a mobile phone, and first devices include a computer, a tablet, and a watch. It may be understood that the first device and the second device may be other terminal devices. This is merely an example for description, and does not mean that this application is limited thereto.

In addition, in FIG. 15, an incoming call notification manner preset in the mobile phone is ringing. The computer meets a first preset condition, and an incoming call notification manner preset in the computer is ringing. The tablet and the watch do not meet the first preset condition.

As shown in FIG. 15, after receiving an incoming call request, the mobile phone gives an incoming call notification through ringing. In the first devices, the computer that meets the first preset condition gives an incoming call notification through ringing. However, the tablet and the watch give an incoming call notification only in a mute mode regardless of incoming call notification manners in the tablet and the watch. In this way, it can be ensured that a user can learn of an incoming call in a timely manner, and disturbance of the incoming call notification to the user is reduced, to improve intelligence of the incoming call notification and improve user experience.

For specific functions of the first device and the second device, refer to the description in the foregoing incoming call notification method. Details are not described herein.

Figure 16:
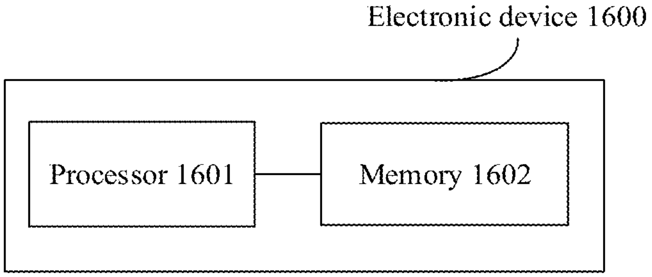
FIG. 16 is a schematic diagram of composition of an electronic device according to an embodiment of this application.

FIG. 16 is a schematic diagram of composition of an electronic device 1600 according to an embodiment of this application. The electronic device 1600 may be any electronic device in the foregoing example. For example, the electronic device 1600 may be a mobile phone or a computer. For example, as shown in FIG. 16, the electronic device 1600 may include a processor 1601 and a memory 1602. The memory 1602 is configured to store computer-executable instructions. For example, in some embodiments, when the processor 1601 executes the instructions stored in the memory 1602, the electronic device 1600 may be enabled to perform any function of the electronic device in the foregoing embodiments to implement any incoming call notification method in the foregoing examples.

It should be noted that all related content of the steps in the foregoing method embodiments may be cited to function description of a corresponding functional module. Details are not described herein.

Figure 17:
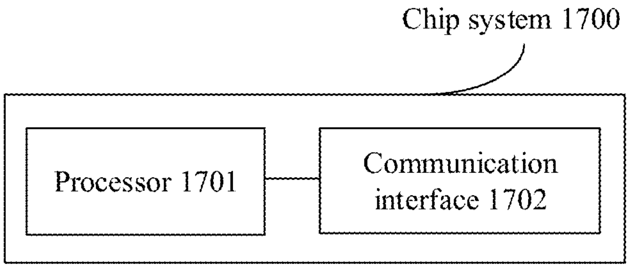
FIG. 17 is a schematic diagram of composition of a chip system according to an embodiment of this application.

FIG. 17 is a schematic diagram of composition of a chip system 1700. The chip system 1700 may be disposed in an electronic device. For example, the chip system 1700 may be disposed in a mobile phone. For example, the chip system 1700 may include a processor 1701 and a communication interface 1702, configured to support the electronic device in implementing the functions in the foregoing embodiments. In a possible design, the chip system 1700 further includes a memory, configured to store program instructions and data that are necessary for the electronic device. The chip system may include a chip, or may include a chip and another discrete device. It should be noted that in some implementations of this application, the communication interface 1702 may also be referred to as an interface circuit.

It should be noted that all related content of the steps in the foregoing method embodiments may be cited to function description of a corresponding functional module. Details are not described herein.

An embodiment of this application further provides a computer storage medium. The computer storage medium stores computer instructions. When the computer instructions are run on a terminal device, the terminal device is enabled to perform the steps of the related method to implement the method in the foregoing embodiments.

An embodiment of this application further provides a computer program product. When the computer program product is run on a computer, the computer is enabled to perform the related steps to implement the method in the foregoing embodiments.

In addition, an embodiment of this application further provides an apparatus. The apparatus may be specifically a chip, a component, or a module. The apparatus may include a processor and a memory that are connected to each other. The memory is configured to store computer-executable instructions. When the apparatus runs, the processor may execute the computer-executable instructions stored in the memory, to enable the chip to perform the method in the foregoing method embodiments.

The terminal device, the computer storage medium, the computer program product, or the chip provided in the embodiments of this application is configured to perform the corresponding method provided above. Therefore, for beneficial effects that can be achieved by the terminal device, the computer storage medium, the computer program product, or the chip, refer to the beneficial effects in the corresponding method provided above. Details are not described herein.

The solutions provided in the embodiments of this application are mainly described above from a perspective of an electronic device. To implement the foregoing functions, the electronic device includes corresponding hardware structures and/or software modules for performing the functions. A person skilled in the art should be easily aware that the example units and algorithm steps described with reference to the embodiments disclosed in this specification can be implemented in this application in a form of hardware or a combination of hardware and computer software. Whether a function is performed by hardware or by driving hardware by using computer software depends on particular applications and design constraints of the technical solutions. A skilled person may use different methods to implement the described functions for each specific application, but it should not be considered that the implementation goes beyond the scope of this application.

In the embodiments of this application, the device may be divided into functional modules based on the foregoing method examples. For example, each functional module may be obtained through division for each corresponding function, or two or more functions may be integrated into one processing module. The integrated module may be implemented in a form of hardware, or may be implemented in a form of a software functional module. It should be noted that division into the modules in the embodiments of this application is an example, and is merely logical function division. In actual implementation, there may be another division manner.

All or some of the functions, actions, operations, or steps in the foregoing embodiments may be implemented by using software, hardware, firmware, or any combination thereof. When being implemented by using a software program, all or some of the functions, actions, operations, or steps may be implemented in a form of a computer program product. The computer program product includes one or more computer instructions. When the computer program instructions are loaded and executed on a computer, all or some of the procedures or functions in the embodiments of this application are generated. The computer may be a general-purpose computer, a dedicated computer, a computer network, or another programmable apparatus. The computer instructions may be stored in a computer-readable storage medium or transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) manner or a wireless (for example, infrared, radio, or microwave) manner. The computer-readable storage medium may be any available medium accessible by a computer or data storage devices including one or more servers, data centers, or the like that may be integrated with a medium. The available medium may be a magnetic medium (for example, a floppy disk, a hard disk, or a magnetic tape), an optical medium (for example, a DVD), or a semiconductor medium (for example, a solid state disk (solid state disk, SSD)), or the like.

Although this application is described with reference to specific features and embodiments, it is clear that various modifications and combinations may be made to this application without departing from the spirit and scope of this application. Correspondingly, this specification and the accompanying drawings are merely example description of this application defined by the appended claims and are considered to cover any and all modifications, variations, combinations, or equivalents in the scope of this application. Clearly, a person skilled in the art can make various modifications and variations to this application without departing from the spirit and scope of this application. In this way, this application is also intended to include these modifications and variations made to this application if they fall within the scope of the claims of this application and equivalent technologies thereof.

What is claimed is:

1. An incoming call notification system, wherein the system comprises one or more first devices and a second device;

the one or more first devices are configured to transmit a feedback message to the second device, the feedback message indicating that a private key of a second system account matches a public key of a first system account, the feedback message being encrypted by the one or more first devices using a public key of the second system account and decrypted by the second device using a private key of the first system account;

the second device is configured to receive an incoming call request;

when the one or more first devices comprise a third device that meets a first preset condition, the third device is configured to: respond to the incoming call request, and give an incoming call notification in an incoming call notification manner preset in the third device, wherein the first preset condition comprises at least one of the following cases: a screen-on state, an input state, and an output state; and when the one or more first devices and the second device comprise a fourth device that does not meet the first preset condition, the fourth device is configured to give an incoming call notification in a mute mode.

2. The incoming call notification system according to claim 1, wherein when the one or more first devices and the second device do not comprise the third device that meets the first preset condition, and an incoming call notification manner preset in the second device is any one of ringing, vibration, and vibration on ring, the one or more first devices are further configured to give an incoming call notification in a mute mode.

3. The incoming call notification system according to claim 1, wherein when the one or more first devices and the second device do not comprise the third device that meets the first preset condition, and the incoming call notification manner preset in the second device is giving a notification in a mute mode, the one or more first devices are further configured to give an incoming call notification in an incoming call notification manner preset in the one or more first devices.

4. The incoming call notification system according to claim 1, wherein before giving an incoming call notification, the one or more first devices are further configured to: determine whether the first device meets a second preset condition, and skip giving an incoming call notification if the first device meets the second preset condition, wherein the second preset condition comprises at least one of the following cases: a Do Not Disturb state and a coordination state;

the Do Not Disturb state is used to indicate that a corresponding device is in a Do Not Disturb mode, a device identifier of a device that initiates the incoming call request is not in a whitelist in the Do Not Disturb mode, and the incoming call request meets a Do Not Disturb rule in the Do Not Disturb mode; and the coordination state comprises at least one of the following: a call state and a multi-screen coordination state.

5. The incoming call notification system according to claim 1, wherein the preset incoming call notification manner comprises: ringing, vibration, vibration on ring, or giving a notification in the mute mode.

6. The incoming call notification system according to claim 1, wherein the one or more first devices are connected by using a near field communication network, and the one or more first devices and the second device are connected by using a near field communication network.

7. The incoming call notification system according to claim 6, wherein when the one or more first devices or the second device receive a first operation, the one or more first devices and the second device are further configured to stop giving an incoming call notification, wherein the first operation is an answer operation or a decline operation for the incoming call notification.

8. The incoming call notification system according to claim 7, wherein the giving an incoming call notification further comprises displaying an incoming call interface, wherein the incoming call interface comprises a first control and a second control, the answer operation is an operation on the first control, and the decline operation is an operation on the second control.

9. An incoming call notification method, applied to an incoming call notification system comprising one or more first devices and a second device, wherein the method comprises:

transmitting, from the one or more first devices to the second device, a feedback message indicating that a private key of a second system account matches a public key of a first system account, the feedback message being encrypted by the one or more first devices using a public key of the second system account and decrypted by the second device using a private key of the first system account;

obtaining, by the one or more first devices, static service information of each device in the incoming call notification system in response to receiving first signaling, wherein the first signaling is sent by the second device to the one or more first devices in response to receiving an incoming call request, the first signaling is used to indicate the one or more first devices to give an incoming call notification, the static service information comprises use state information and a preset incoming call notification manner, and the use state information is used to indicate whether the corresponding device meets the first preset condition;

when the one or more first devices comprise a third device that meets the first preset condition, giving, by the third device, an incoming call notification in an incoming call notification manner preset in the third device; and when the one or more first devices and the second device comprise the third device, giving, by a fourth device that does not meet the first preset condition, an incoming call notification in a mute mode.

10. The incoming call notification method according to claim 9, wherein the method further comprises:

when the one or more first devices and the second device do not comprise the third device that meets the first preset condition, and an incoming call notification manner preset in the second device is any one of ringing, vibration, and vibration on ring, giving, by the one or more first devices, an incoming call notification in a mute mode.

11. The incoming call notification method according to claim 9, wherein when the one or more first devices and the second device do not comprise the third device, and the incoming call notification manner preset in the second device is giving a notification in a mute mode, giving, by the one or more first devices, an incoming call notification in an incoming call notification manner preset in the one or more first devices.

12. The incoming call notification method according to claim 9, wherein the method further comprises:

determining, by the one or more first devices, whether the one or more first devices meet a second preset condition, and skipping giving an incoming call notification if the one or more first devices meet the second preset condition, wherein the second preset condition comprises at least one of the following cases: a Do Not Disturb state and a coordination state;

the Do Not Disturb state is used to indicate that a corresponding device is in a Do Not Disturb mode, a device identifier of a device that initiates the incoming call request is not in a whitelist in the Do Not Disturb mode, and the incoming call request meets a Do Not Disturb rule in the Do Not Disturb mode; and the coordination state comprises at least one of the following: a call state and a multi-screen coordination state.

13. A first device of an incoming call notification system, wherein the incoming call notification system comprises a second device, the first device comprises one or more processors and one or more memories, the one or more memories are coupled to the one or more processors, and the one or more memories store computer instructions; and when the one or more processors execute the computer instructions, the first device is configured to:

transmit, from the first device to the second device, a feedback message indicating that a private key of a second system account matches a public key of a first system account, the feedback message being encrypted by the first device using a public key of the second system account and decrypted by the second device using a private key of the first system account;

obtain, by the first device, static service information of each device in the incoming call notification system in response to receiving first signaling, wherein the first signaling is sent by the second device in response to receiving an incoming call request, the first signaling is used to indicate the first device to give an incoming call notification, the static service information comprises use state information and a preset incoming call notification manner, and the use state information is used to indicate whether the corresponding device meets the first preset condition;

when a third device meets the first preset condition, give an incoming call notification in an incoming call notification manner preset in the third device; and when a fourth device does not meet the first preset condition, give an incoming call notification in a mute mode.

14. The first device according to claim 13, wherein when the one or more processors execute the computer instructions, the first device is further configured to:

give an incoming call notification in a mute mode, and an incoming call notification manner preset in the second device is any one of ringing, vibration, and vibration on ring.

15. The first device according to claim 13, wherein when the one or more processors execute the computer instructions, the first device is further configured to:

give an incoming call notification in an incoming call notification manner preset in the first device, and the incoming call notification manner preset in the second device is giving a notification in a mute mode.

16. The first device according to claim 13, wherein when the one or more processors execute the computer instructions, the first device is further configured to:

determine whether the first device meets a second preset condition, and skip giving an incoming call notification if the first device meets the second preset condition, wherein the second preset condition comprises at least one of the following cases: a Do Not Disturb state and a coordination state;

the Do Not Disturb state is used to indicate that a corresponding device is in a Do Not Disturb mode, a device identifier of a device that initiates the incoming call request is not in a whitelist in the Do Not Disturb mode, and the incoming call request meets a Do Not Disturb rule in the Do Not Disturb mode; and the coordination state comprises at least one of the following: a call state and a multi-screen coordination state.

* * * * *